US009142144B2

(12) United States Patent
Meglan et al.

(10) Patent No.: US 9,142,144 B2
(45) Date of Patent: Sep. 22, 2015

(54) HEMORRHAGE CONTROL SIMULATOR

(75) Inventors: Dwight Meglan, Westwood, MA (US);
Howard Champion, Annapolis, MD
(US); Chih-hao Ho, Reston, VA (US)

(73) Assignee: SIMQUEST LLC, Silver Spring, MD
(US)

( * ) Notice: Subject to any disclaimer, the term of this
patent is extended or adjusted under 35
U.S.C. 154(b) by 689 days.

(21) Appl. No.: 13/318,016

(22) PCT Filed: Jun. 16, 2010

(86) PCT No.: PCT/US2010/038809
§ 371 (c)(1),
(2), (4) Date: Oct. 28, 2011

(87) PCT Pub. No.: WO2010/148078
PCT Pub. Date: Dec. 23, 2010

(65) Prior Publication Data
US 2012/0045742 A1     Feb. 23, 2012

Related U.S. Application Data

(60) Provisional application No. 61/187,567, filed on Jun. 16, 2009.

(51) Int. Cl.
*G09B 23/28* (2006.01)
*G09B 23/30* (2006.01)

(52) U.S. Cl.
CPC ............... *G09B 23/28* (2013.01); *G09B 23/30* (2013.01); *G09B 23/303* (2013.01)

(58) Field of Classification Search
USPC .................. 434/156, 268, 272, 365; 345/156;
128/898; 600/545
See application file for complete search history.

(56) References Cited

U.S. PATENT DOCUMENTS 8,405,604 B2 * 3/2013 Pryor et al. .................... 345/156
2004/0237970 A1 * 12/2004 Vournakis et al. ............ 128/898

(Continued)

FOREIGN PATENT DOCUMENTS

DE         10238011        3/2004
WO       WO2007019546      2/2007
WO       WO2007/121341    10/2007

OTHER PUBLICATIONS

Design and implementation of medical training simulators by Nigel W. John, dated 2008.*
6. Haptic Interfaces earliest date posted on Internet is Apr. 30, 1997 by Washington.edu http://www.hitl.washington.edu/scivw/scivw-ftp/publications/IDA-pdf/HAPTIC1.PDF.*
Kotranza et al., "Virtual Human+Tangible Interface=Mixed Reality Human an Initial Exploration with a Virtual Breast Exam Patient", IEEE Virtual Reality, Mar. 8-12, 2008, pp. 99-106.
Lee et al., "Augmented Foam: A Tangible Augmented Reality for Product Design", Proceedings of the International Symposium on Mixed and Augmented Reality, Oct. 2005, pp. 106-109.
International Search Report mailed May 26, 2011, for PCT/US2010/038809.

*Primary Examiner* — Robert J Utama
(74) *Attorney, Agent, or Firm* — Pillsbury Winthrop Shaw Pittman, LLP

(57) ABSTRACT

A simulator trains for hemorrhage control using hemostatic agents, tourniquets, and/or other hemorrhage control techniques in a simulator that works with a wide variety of existing human surrogates. The simulator merges a live video feed of the surrogate and trainee's hands (or objects interacting with the surrogate) with a computer-generated visual representation of the wound and hemorrhaging blood to provide an immersive display experience to the trainee without requiring different surrogates for different simulated wounds. The trainee may wear pulse-generating glove(s) that simulate the patient's pulse where the trainee's finger tip contacts the surrogate. A sensorized substrate (e.g., load sensors, haptic output generators) may automatically be moved between the trainee and the surrogate to sense interaction with the surrogate and provide haptic feedback. The substrate may replace the surrogate altogether. The simulator may alternatively simulate events and objects other than wounds and humans.

20 Claims, 10 Drawing Sheets

(56) References Cited

U.S. PATENT DOCUMENTS

| | | |
|---|---|---|
| 2008/0187896 A1* | 8/2008 | Savitsky .................. 434/272 |
| 2009/0011394 A1 | 1/2009 | Meglan |
| 2010/0159434 A1* | 6/2010 | Lampotang et al. .......... 434/365 |
| 2011/0015539 A1* | 1/2011 | deCharms ................... 600/545 |
| 2013/0203032 A1* | 8/2013 | Bardsley et al. ............. 434/268 |

* cited by examiner

HEMORRHAGE CONTROL SIMULATOR

CROSS REFERENCE

This application is a U.S. National Stage of International Application No. PCT/US2010/038809, filed Jun. 16, 2010, which claims the benefit of priority to U.S. Provisional Patent Application No. 61/187,567, titled "HEMORRHAGE CONTROL SIMULATOR," filed Jun. 16, 2009. The entire contents of all of which are incorporated herein by reference in their entireties.

STATEMENT REGARDING FEDERALLY SPONSORED RESEARCH AND DEVELOPMENT

This invention was made with government support under US Army Contract #W91CRB-10-C-0001 awarded by the Department of Defense. The government has certain rights in the invention.

BACKGROUND OF THE INVENTION

1. Field of the Invention

The present invention relates to devices and methods for training individuals to treat an individual with a hemorrhaging injury.

2. Description of Related Art

Fatalities resulting from prehospital blood loss caused by limb wounds can be reduced with proper tourniquet placement and use. The proper placement and use of a tourniquet is critical to its efficacy, but difficult to learn. If a tourniquet is placed too close to the wound, it may be ineffective at stopping blood loss. Conversely, if the tourniquet is placed too far from the wound, use of the tourniquet may sacrifice more of the limb than is needed to stop the hemorrhaging. Overly tight application of a tourniquet may result in unnecessary loss of the tourniqueted limb. Conversely, overly loose application of a tourniquet may fail to stop the hemorrhaging and result in shock and/or death.

In view of the importance of proper tourniquet use, it is important to properly train individuals who might encounter and need to treat such wounds (e.g., soldiers, paramedics, civilians in hazardous environments, etc.). Conventionally, the use of a tourniquet has been taught by an instructor using a mannequin. When a student practices applying a tourniquet to the mannequin, the instructor must carefully supervise to ensure proper placement and application of the tourniquet. The required supervision limits class size, instructor feedback, and the amount of hands-on practice that each student receives.

Conventional tourniquet training mannequins may include a hemorrhage simulator that pumps fluid (e.g., clear or red water) out of the simulated wound until the instructor determines that the tourniquet is properly applied and manually turns off the pump.

It has also been difficult to effectively train personnel in the control of deep bleeding hemorrhage, particularly in core body locations where a tourniquet cannot be used.

Teaching limb or deep bleeding hemorrhage control is difficult without using a physical specimen. Use of a physical hemorrhage surrogate may require a specific model for each type of injury and the use of a blood analog that must be pumped to the injury site. If a pulse is to be used for assessment of the hemorrhage treatment a specific pulse device must be placed in a specific location to be felt. If objective quantitative measurement of the physical characteristics of the trainees' contact with the surrogate is required, it is difficult to effectively instrument for this and it is not readily available in commercial training surrogates. Therefore, teaching a diversity of hemorrhage control techniques is a costly and complex undertaking because of obtaining, using, and maintaining a number of teaching models. In addition, there are limits on injury complexity that can be represented with physical models and linking time progression of the patient physiologic response to the nature of the injury and the specific actions taken by the learner is difficult to do. Finally, assessment of trainee performance is relegated to being a qualitative assessment of a trained instructor rather than an objective, reliable, consistent, quantitative measurement.

SUMMARY OF EMBODIMENTS OF THE INVENTION

For extremity injuries, teaching proper tourniquet technique can be a messy and taxing business due to the manually controlled bleeding systems used in the mannequins. U.S. Patent Application Publication No. 2009/0011394, titled "LIMB HEMORRHAGE TRAUMA SIMULATOR," describes a simulator for training with respect to limb traumas. The entire contents of U.S. Patent Application Publication No. 2009/0011394 are hereby incorporated by reference herein.

In addition, the variety and complexity of scenarios that can be used to provide medics with experience is limited by the practical realities of using these mannequins. In the case of bleeding that is not amenable to tourniquets for its control, the training options are much more limited. While in the past several years the introduction of a variety of hemostatic agents has become wide spread for these situations, there are limited means at present for teaching medics to use these products that allows them to experience the real world behavior of the agents as they react with the wound. These agents are typically specifically constructed to react to the presence of blood and the resulting chemical reaction should be experienced to understand their proper use. Yet this is not typically possible at this time. In addition, some of the agents are expensive and should be used in different ways depending upon the type of wound being treated. This makes it even more difficult to provide the variety of experiences necessary for proper use of hemostatic agents in theatre. Accordingly, one or more embodiments of the present invention provides a training approach to non-tourniquet amendable bleeding, including the use of hemostatic agents.

One or more embodiments of the present invention provides a hemorrhage control simulator that provides diverse hemorrhage control training without the need for fluids, specifically placed pulse devices, or a multiplicity of physical training surrogates (e.g., mannequins). The simulator may provide a computer simulation of the hemorrhage combined with specific display and sensing technologies to provide the trainee with a perceptually consistent experience of interacting to control a hemorrhage.

One or more embodiments of the present invention provides a hemorrhage control simulator that allows training of diverse hemorrhagic situations with a single surrogate (e.g., mannequin).

One or more embodiments of the present invention provides a hemorrhage control simulator that has no disposable materials.

One or more embodiments of the present invention provides a hemorrhage control simulator that has minimal physical entities that must be manipulated by the trainee minimizing the maintenance cost for providing training.

One or more embodiments of the present invention provides a hemorrhage control simulator that can work with a wide variety of physical surrogates from a wide variety of manufacturers, including surrogates already commonly owned by training institutions.

One or more embodiments of the present invention provides a hemorrhage control simulator that allows objective, uniform assessment of trainee performance across instructors and locations of training.

One or more embodiments of the present invention provides a hemorrhage control simulator that allows remote training to enable maintenance of skills.

One or more embodiments of the present invention provides a hemorrhage control simulator that allows complex scenarios to be authored and distributed to all simulation users at all locations simultaneously.

One or more embodiments of the present invention provides a hemorrhage control simulator that allows the performance of the trainee to be integrated into a larger simulation framework such that multiple casualties could be treated simultaneously and the outcome of those treatments having an effect in real-time on a larger situation such as allocation of resources in a battle or mass casualty situation.

One or more embodiments of the present invention provides a hemorrhage control simulator that allows the training sessions of many individuals to be aggregated and evaluated for patterns on how to optimize the effectiveness of training including assessment of performance at times after initial training to evaluate retention of training.

One or more embodiments of the present invention provides a simulator that includes a physical surrogate for a portion of a simulated human patient, the surrogate having a surface feature of a portion of a human body. The simulator also includes a camera system aimed at the surrogate to generate an input video feed and a processor having a program operatively connected to the camera system, wherein the program is programmed to create a simulation of an interaction between at least one object (for example, a user's hand(s), gauze, a medical instrument) and the simulated patient. The program is programmed to, in real time: receive the input video feed; determine, based at least in part on the input video feed, a location of the surrogate and the at least one object; detect an interaction between the at least one object and the surrogate; generate a simulated consequence of the detected interaction between the at least one object and the surrogate; generate a simulated location and appearance of the simulated consequence on the simulated human patient; identify a portion of the simulated consequence that is not obstructed from a user's view according to the simulation; generate a visual rendering of the portion of the appearance of the simulated consequence; determine from the simulated location of the simulated consequence a corresponding position of the visual rendering relative to the surrogate; and generate an output video feed that comprises at least the visual rendering. The simulator also includes a display operatively connected to the processor and configured to display the output video feed so that the visual rendering is viewable along a line of sight toward the position of the visual rendering relative to the surrogate.

According to one or more of these embodiments, the display comprises a projector display that is positioned and configured to project the visual rendering onto the position of the visual rendering relative to the surrogate.

According to one or more of these embodiments, the display comprises a video display and a partial mirror, the partial mirror being configured and positioned so as to be along the line of sight such that both the surrogate and position of the visual rendering relative to the surrogate can be viewed through the partial mirror. The video display is operatively connected to the processor and configured to display the output video feed. The video display is positioned relative to the partial mirror such that during use the visual rendering is reflected off of the partial mirror from the video display to the user along the line of sight such that the visual rendering appears to the user to be disposed at the position of the visual rendering relative to the surrogate.

According to one or more of these embodiments, the program is programmed to, in real time, overlay the visual rendering onto the input video feed to generate the output video feed. The display is positioned so as to be interposed between the user and the position of the visual rendering relative to the surrogate.

According to one or more of these embodiments, the simulator further comprises a load sensor operatively connected to the surrogate to generate a load signal representative of a sensed load applied to the surrogate via the at least one object. The processor and program are operatively connected to the load sensor. The program is programmed to, in real time, receive the load signal, and detect the interaction between the at least one object and the surrogate based at least in part on the load signal. The load signal may be representative of a magnitude, location, and direction of force being applied to the surrogate by the at least one object.

According to one or more of these embodiments, the program is programmed to create the simulation so as to simulate an interaction between the at least one object and a simulated wound on the simulated patient. The location and appearance of the simulated consequence comprises the location and appearance of the simulated wound and simulated blood flow from the simulated wound. The program is programmed to, in real time, generate the location and appearance of the simulated wound and simulated blood flow based on a hemodynamic model of at least the portion of the simulated patient being represented by the surrogate, the determined location of the surrogate and the at least one object, and the load signal.

According to one or more of these embodiments, the simulator also includes a physical representation of a tourniquet, and a force sensor operatively connected to the physical representation of a tourniquet to generate a tourniquet force signal representative of a force being applied by the tourniquet to the surrogate. The force sensor is operatively connected to the processor to provide the tourniquet force signal to the processor and the program, and the program is programmed to generate the location and appearance of the simulated wound and simulated blood flow from the simulated wound based on the tourniquet force signal.

According to one or more of these embodiments, the simulator further comprises a haptic output device configured and arranged to be disposed between the at least one object and the surrogate. The haptic output device is operatively connected to the processor. The program is programmed to, in real time, cause the haptic output device to generate haptic feedback based, at least in part, on the detected interaction between the at least one object and the surrogate. The haptic output device may include a heat generator that generates heat and/or a pulse generator that generates a simulated pulse. The simulator may also include a glove configured to be worn by the user, wherein the haptic output device is connected to the glove such that the haptic feedback is manually detectable by the user's hand when wearing the glove.

According to one or more of these embodiments, the simulator includes a glove comprising a pulse generator configured to receive a simulated pulse signal and generate a pulse representative of the simulated pulse signal. The generated pulse is manually detectable by the user's hand when wearing the glove. The processor and program are operatively connected to the pulse generator. The program is programmed to, in real time: determine, based at least in part on the input video signal, a location of the glove; calculate the simulated pulse signal based on a hemodynamic model of at least the portion of the simulated patient being represented by the surrogate and the determined location of the surrogate and the glove; and transmit the simulated pulse signal to the pulse generator.

According to one or more of these embodiments, the simulator also includes a user camera system operatively connected to the processor and aimed toward an area where at least one eye of the user should be during use of the simulator, the user camera system being configured to generate a user video. The program is programmed to, in real time, detect a position of the at least one eye of the user, and calculate the line of sight based on the detected position of the at least one eye.

One or more embodiments of the present invention provide a method of using a simulator that includes a physical surrogate for a portion of a simulated human patient, the surrogate having a surface feature of a portion of a human body. The method includes: receiving an input video feed from a camera system aimed at the surrogate; determining, based at least in part on the input video feed, a location of the surrogate and at least one movable object other than the surrogate; detecting an interaction between the at least one object and the surrogate; generating a simulated consequence of the detected interaction between the at least one object and the surrogate; generating a simulated location and appearance of the simulated consequence on the simulated human patient; identifying a portion of the simulated consequence that is not obstructed from a user's view according to the simulation; generating a visual rendering of the portion of the appearance of the simulated consequence; determining from the simulated location of the simulated consequence a corresponding position of the visual rendering relative to the surrogate; generating an output video feed that comprises at least the visual rendering; and displaying the output video feed on a display that is positioned so that the visual rendering is viewable along a line of sight toward the position of the visual rendering relative to the surrogate.

One or more embodiments of the present invention provide a simulator that includes a movable substrate, an automated positioning device connected to the substrate and constructed and configured to selectively move the substrate, and a camera system aimed at at least a portion of an area over which the automated positioning device can move the substrate, the camera system being configured to provide an input video feed. The simulator also includes a processor having a program operatively connected to the camera system and automated positioning device. The program is programmed to, in real time: receive the input video feed; determine, based at least in part on the input video feed, a location of at least one movable object other than the substrate; determine a position, relative to the at least one object, of a simulated surface of a simulated object; and, when the at least one object is detected to be within a predetermined threshold distance from the simulated surface, control the automated positioning device to move the substrate to a position on the simulated surface that is proximate the at least one object.

According to one or more of these embodiments, the program is programmed to, in real time, generate a visual rendering of the simulated object and at least one object to create an output video feed. The simulator further comprises a display operatively connected to the processor and configured to display the output video feed.

According to one or more of these embodiments, the simulator further comprises a load sensor connected to the substrate so as to generate a load signal representative of a sensed load applied by the at least one object to the substrate. The load sensor is operatively connected to the processor. The program is programmed to, in real time: create a simulated consequence of the sensed load on the simulated object based at least in part on the load signal; generate a visual rendering of the simulated consequence; and incorporate the visual rendering of the simulated consequence into the output video feed.

According to one or more of these embodiments, the simulated object comprises a simulated human being with a simulated wound, the simulated consequence of the characteristic on the simulated object comprises an appearance of the simulated wound and simulated blood flow from the simulated wound, and the program is programmed to, in real time, generate the appearance of the simulated wound and simulated blood flow from the simulated wound based on a hemodynamic model of the simulated human being.

According to one or more of these embodiments, the simulator further comprises a haptic output device connected to the substrate, and the haptic output device is operatively connected to the processor. The program is programmed to, in real time: detect an interaction between the at least one object and the substrate; and cause the haptic output device to generate haptic feedback based on the detected interaction.

According to one or more of these embodiments, the simulated object comprises at least a portion of a simulated human patient with a simulated wound, the simulated consequence comprises a simulated consequence of the sensed load on the simulated wound, and the output video feed comprises the simulated wound.

According to one or more of these embodiments, the simulated object comprises a simulated living being (e.g., a human being or animal). The simulated living being may have a simulated wound.

According to one or more of these embodiments, the simulator further comprises a haptic output device connected to the substrate, and the haptic output device is operatively connected to the processor. The program is programmed to, in real time: detect an interaction between the at least one object and the substrate; create a simulated consequence of the detected interaction on the simulated object; and cause the haptic output device to generate haptic feedback based on the simulated consequence.

According to one or more of these embodiments, the simulator further comprises a physical surrogate having surface features that correspond to the simulated surface of the simulated object, and the camera system is aimed at the physical surrogate. The program is programmed to, in real time: determine, based at least in part on the input video feed, a location of the surrogate relative to the at least one movable object; and cause the automated positioning device to position the substrate against the surrogate.

One or more embodiments of the present invention provides a method of using a simulator. The simulator includes a movable substrate and an automated positioning device connected to the substrate and constructed and configured to selectively move the substrate. The method includes, in real time: receiving an input video feed from a camera system aimed at at least a portion of an area over which the automated positioning device can move the substrate; determining, based at least in part on the input video feed, a location of at least one movable object other than the substrate; determining a position, relative to the at least one object, of a simulated surface of a simulated object; and, when the at least one object is detected to be within a predetermined threshold distance from the simulated surface, causing the automated positioning device to move the substrate to a position on the simulated surface that is proximate the at least one object.

One or more embodiments of the present invention provides a simulator for simulating physical interaction between at least one physical object and a simulated surface of a simulated object. The simulator includes a movable substrate, and an automated positioning device connected to the substrate and constructed and configured to selectively move the substrate. The simulator also includes a processor having a program operatively connected to the automated positioning device, wherein the program is programmed to, in real time, cause the automated positioning device to position the substrate along the simulated surface of the simulated object so as to prevent the at least one physical object from penetrating the simulated surface.

One or more embodiments of the present invention provides a simulator that includes a physical surrogate for a portion of a simulated human patient, the surrogate having the surface features of a portion of a human body. The simulator also includes a camera system aimed at the surrogate to provide an input video feed, and a glove comprising a pulse generator configured to receive a simulated pulse signal and generate a pulse representative of the simulated pulse signal. The generated pulse is manually detectable by a user's hand wearing the glove. The simulator also includes a processor having a program operatively connected to the camera system and pulse generator. The program is programmed to simulate an interaction between the user's hand and the patient. The program is programmed to, in real time: receive the input video signal; determine, based at least in part on the input video signal, a location of the surrogate and the glove; calculate the simulated pulse signal based on a hemodynamic model of at least the portion of the simulated human patient and the determined location of the surrogate and the glove; and transmit the simulated pulse signal to the pulse generator.

According to one or more of these embodiments, the simulator also includes a load sensor positioned and configured to generate a load signal representative of a sensed load applied by the user's hand to the surrogate. The program is programmed to, in real time, determine the simulated pulse signal based at least in part on the load signal. The load sensor may be supported by the glove.

These and/or other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

FIGS. 1-4 and 6 illustrate a hemorrhage control simulator 10 according to an embodiment of the present invention. The simulator 10 uses a computational model of human body's hemodynamic system combined with a physics-based simulation of blood flow to produce means to train for hemorrhage control using hemostatic agents, tourniquets, and/or other hemorrhage control techniques in a simulator that works with a wide variety of existing surrogates representing a human patient. By using these real-time computation approaches with an augmented reality display and interaction system that allows the computer-based simulation to be directly visually overlaid upon the mannequin anatomy, the trainee can work with the mannequin in a normal manner while seeing the effects of his/her actions with the computer generated bleeding. Because the approach may use the shape of the mannequin anatomy at the location of bleeding, one or more embodiments of the invention will work with whatever mannequin is available. In addition, the display can be configured for either an immersive experience (e.g., via a head mounted display equipped with a display(s) and camera(s)) or a traditional computer monitor allowing for flexible deployment based on available resources. Finally, because the simulator 10 may be based solely on computational models of bleeding and hemostatic agent behavior, there is great flexibility in variety of training scenarios that can be provided and the trainee's interaction with the simulator 10 will inherently be quantitative allowing objective measures of performance to be recorded and analyzed for summative assessment.

Figure 1:
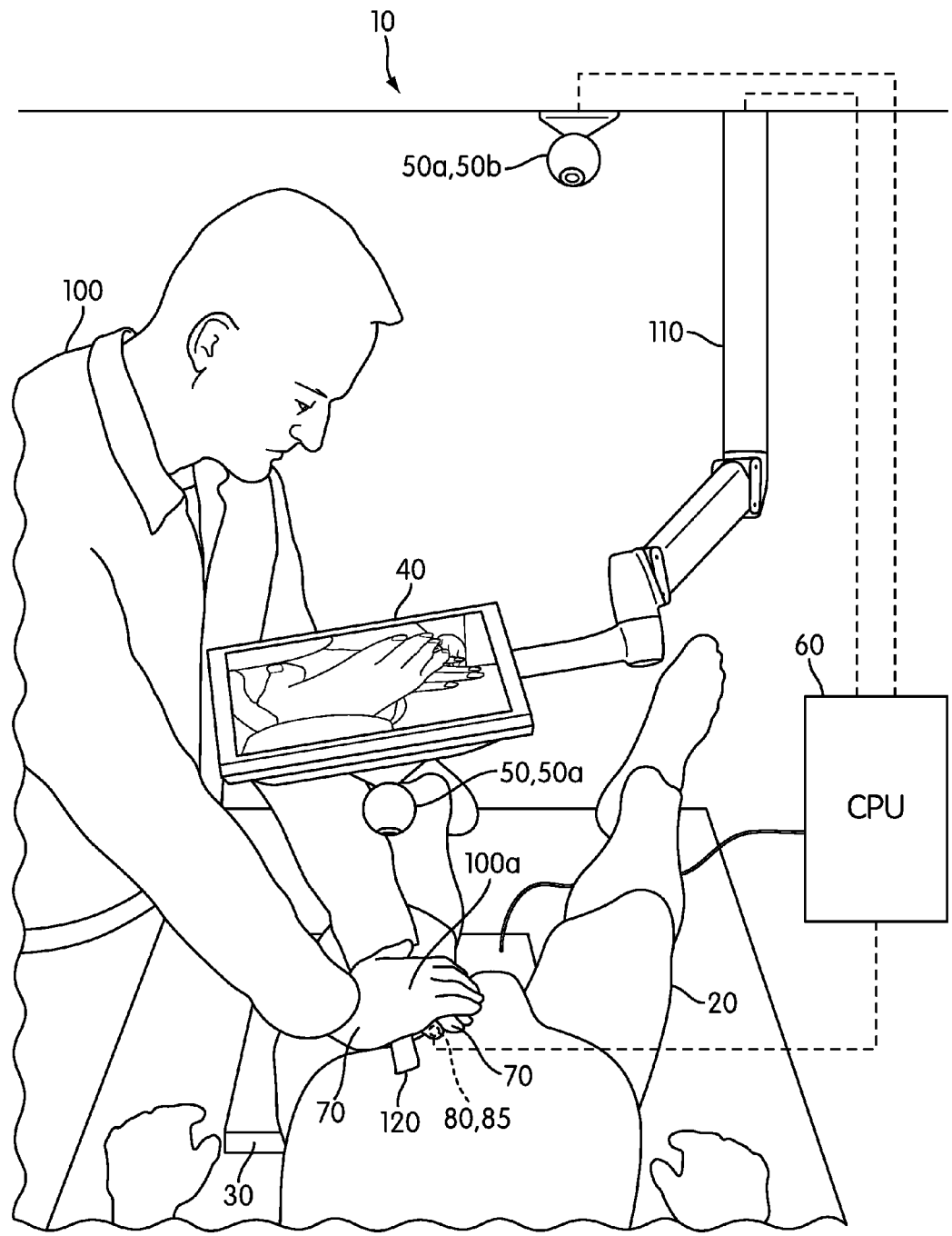
FIG. 1 is a perspective view of a user using a hemorrhage control simulator according to an embodiment of the present invention.

Turning now to the physical structure of the simulator, as shown in FIG. 1, the simulator 10 comprises a physical surrogate 20, a load sensor 30, a display 40, a camera system 50, a processor 60 running a program 90, and pulse-feedback gloves 70.

The surrogate 20 provides a physical representation of the anatomic area of a human body to be trained upon. In the illustrated embodiment, the surrogate 20 comprises a full size body mannequin. However, the surrogate 20 may alternatively comprise a physical representation of just the anatomic area to be trained upon.

The load sensor 30 is operatively connected to the surrogate 20 so as to sense forces being applied to the surrogate 20 by a trainee 100. In the illustrated embodiment, the amount of force applied by the trainee 100 to the physical surrogate 20 is measured by placing a 6-load-cell plate underneath the surrogate 20 such that the combined magnitude, direction, and location of any forces or moments applied on the surrogate 20 by the trainee 100 are measured in real-time. However, any other suitable load sensor 30 may be used without deviating from the scope of the present invention (e.g., an array of pressure sensors covering the relevant surface of the surrogate 20 to directly measure the magnitude and location of forces applied to the surrogate 20, for example as disclosed in U.S. Patent Application Publication No. 2009/0011394). While the above-discussed six-component load sensor 30 is suitable for determining a magnitude, direction, and location of all combined forces being applied to the surrogate 20, additional load cells may be added so as to separately calculate the magnitude, direction, and location of multiple discrete forces. With sufficient sensors/load cells, the forces being applied to the surrogate 20 may be broken down more discretely (e.g.; distinguishing between the forces applied by user's two hands; distinguishing between the forces of separate fingers, different objects, different part of different objects, etc.).

The load sensor 30 may additionally and/or alternatively comprise the camera system 50 (or a discrete camera system, laser-based distance/range detector, or other suitable sensor capable of detecting deformation of the surrogate 20) and a load sensor program or sub-program of the program 90 (or another discrete program and processor). The load sensor program detects from the input video feed deformation of the surrogate 20 caused by a load applied by the at least one object to the surrogate 20. By determining the degree of deformation (e.g., the area of deformation, the depth of deformation), the load sensor program may use known elasticity/deformation properties of the surrogate 20 to determine the load applied to the surrogate 20, and generate a corresponding load signal. According to one or more embodiments, the load sensor program uses inverse finite element analysis to determine the applied load.

In this embodiment, the load sensor 30 senses a magnitude of a force applied to the load sensor 30. However, according to alternative embodiments, the load sensor 30 may merely detect the binary presence of a load (e.g., whether or not a load is being applied). In such an embodiment, the load sensor 30 may comprise a contact sensor that detects whether or not there is contact with the load sensor.

The display 40 is placed in the trainee's line of sight between the trainee's eyes and the surrogate 20. In the embodiment illustrated in FIG. 1, the display 40 comprises a flat panel monitor 40 supported by a repositionable monitor stand 110.

The video camera system 50 includes one or more video cameras 50a, 50b, which have been calibrated so that the position and orientation of viewed objects can be quantitatively measured in real-time by a program 90 that is discussed in greater detail below. The camera 50a provides video from the point of view of the trainee 100 (e.g., along the trainee's line of sight between his/her eyes and the surrogate 20). Thus, the image seen by the camera 50a is that of the physical surrogate 20 and this image is merged with the simulation (explained below) so that the real surrogate 20 is displayed with a simulated wound 140 and hemorrhaging blood 150 in a manner consistent with the view point of the display 40 and trainee's eyes. However, the display 40 may be otherwise positioned without deviating from the scope of the present invention. In the illustrated embodiment, the camera 50a is mounted to a rear side of the display 40.

The processor 60 may be programmed to know the external surface geometry of the surrogate 20 (e.g., via the computer-aided design software used to create the surrogate 20 in the first place; via previous use of commercially available stereophotogrammetry hardware/software packages). If computer-aided design (CAD) files are available from the surrogate 20 manufacturer (e.g., mannequin manufacturer), then these can be used instead of having to generate the surface geometry.

Alternatively, the processor 60 may learn the external surface geometry of the surrogate 20 through measurement in real time just prior to use of the surrogate in the simulator 10. The processor 60 may use any suitable technique (e.g., a laser scanner or stereophotogrammetry via the camera system 50 (or another suitable camera system)). There are a variety of real-time shape extraction solutions that are more expensive and elaborate. The ability of the simulator 10 to learn the relevant geometry of the surrogate 20 in real time may enable any available surrogate to be instantaneously adapted for use with the simulator 10 (e.g. training mannequins already available for use in the types of environments where the simulator 10 will commonly be used). However, in various embodiments, such real-time surface calculation is omitted because offline measurement of the surrogate 20 surface is typically sufficient, and because there will likely not be significant deformation of the surrogate 20.

With the surface geometry known by one of these means, the underlying anatomy for that relevant region of the surrogate 20 can be defined in the same scale and coordinate frame as the surface so that the simulation of the trainee's hands interacting with the underlying anatomy can be computed as well as the blood vessel damage defined for the simulated wound 140 according to the scenario being used. This anatomic geometry is typically known ahead of time through a standard 3D anatomic atlas and then adjusted to match overlying surface by a medical illustrator.

Figure 4:
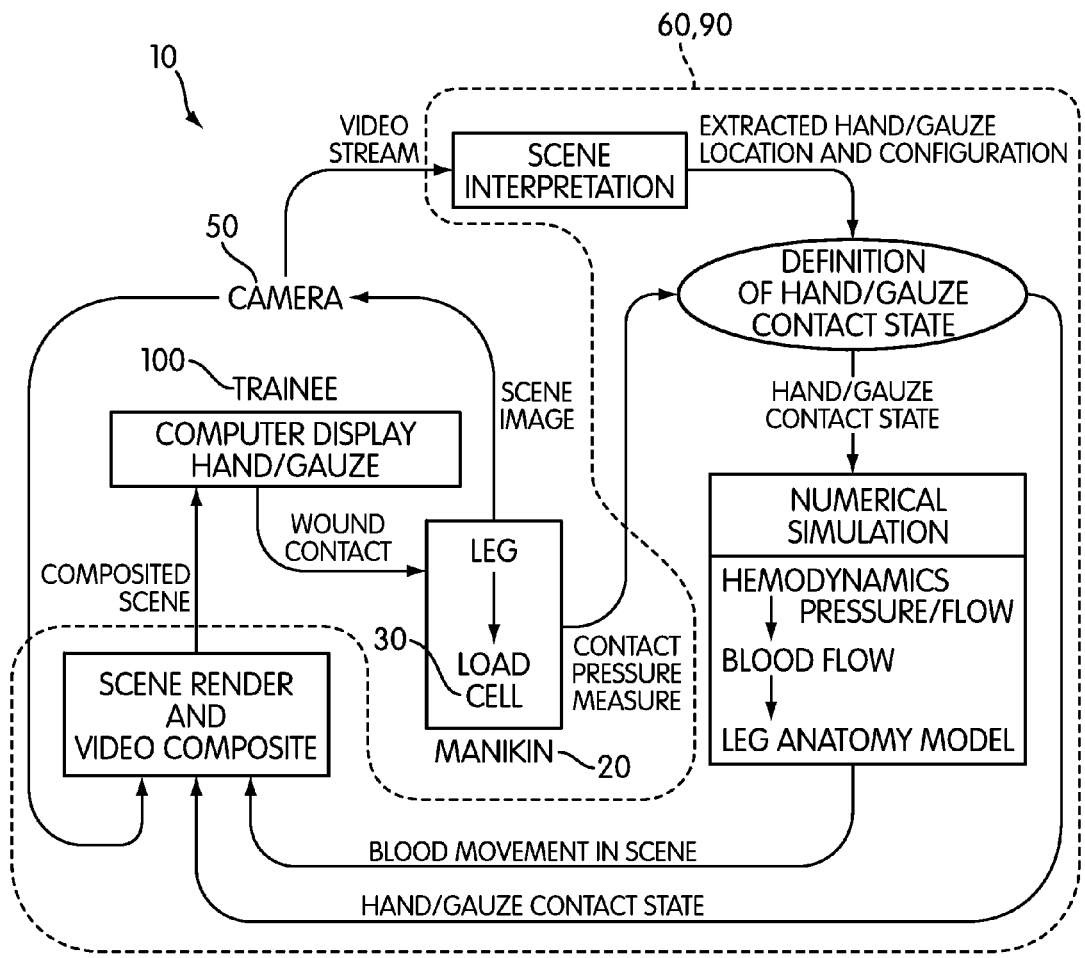
FIG. 4 is a flow diagram of the operation of the simulator of FIG. 1.

As shown in FIGS. 1 and 4, the processor 60 is operatively connected to the load sensor 30, display 40, camera system 50, and gloves 70. As shown in FIG. 4, the processor 60 includes a program 90 programmed to (a) generate the simulated wound 140 and blood 150 hemorrhaging therefrom, (b) identify and determine the position and orientation of objects viewed by the camera system 50, and (c) perform a computational simulation of the behavior of blood as it escapes from the simulated wound 140 (see FIG. 2) and the reaction of blood flow within the simulated environment to its physical interaction with the surrogate 20.

The program 90 includes one or more wound scenarios that each include one or more wounds 140. Different scenarios include wounds 140 that differ in location, type, severity, etc.

The program 90 may use any suitable technique for identifying and determining the position and orientation of objects viewed by the camera system 50. Such objects may include, among others, the surrogate 20, trainee 100, and any additional objects being used by the trainee 100 to treat a simulated trauma (e.g., hemostatic agents; bandages; hemostatic-agent enhanced gauze 120; tourniquets 200, medical instruments, etc.). As illustrated in FIG. 1, the use of two cameras 50a,50b may provide stereoscopic information to triangulate the location of imaged objects. However, depending on the type of video camera system 50 used, a single camera may be sufficient to determine the position and orientation of the objects. For example, the video camera system 50 may include a single camera that includes distance sensors whose measurements are provided to the processor 60 and program 90 to assist the program 90 in determining the position and orientation of the imaged objects.

The gloves 70, surrogate 20, and/or any other objects to be imaged (e.g., gauze 120, the tourniquet 200 described below) may be color coded to help the program 90 distinguish between these objects using the video feed(s) from the camera system 50. Additionally and/or alternatively, the objects may include spatial tracking marker(s) that the program 90 can identify from the video feed(s) and use to help determine the position and orientation of the objects. Such tracking markers are now very widely used in augmented reality (AR) systems as is commonly seen in open source AR codes such as AR Toolkit and FLARkit.

The program 90 may use a variety of conventional software programs/code to detect the three-dimensional shape and position and orientation of the surrogate 20, the trainee's hands, and any other object that interacts with the surrogate. The program 90 may use a variety of conventional software programs to distinguish between imaged objects and track and identify their movements. Such software may include the algorithms and codes including various combinations of: code from EPFL called BazAR, PTAM from Oxford, Robot Operating System (ROS) originated with and maintained by Willow Garage, OpenCV, and/or code/software from ARToolWorks such as ARToolKit, The program 90 may use data from the load sensor 30 to help determine where the trainee's hands are imparting forces on the surrogate 20.

Numerous approaches are in use to recognize the overall hand pose as well as extract and define the finger configuration for use in gesture recognition. While this option is intriguing for fully describing the trainee's hands, it is computationally complex and can be prone to error. Accordingly, while such full finger configuration calculations can be incorporated into the program 90 according to an embodiment of the invention, the program 90 may alternatively, and more simply, calculate the overall location and coverage of the hands relative to the simulated wound 140. This is a simpler computer vision problem and can be accomplished using straightforward, reliable approaches such as thresholding and blob tracking.

The program 90 synthesizes the load sensor 30 data with the determined 3D position and orientation of the trainee's hands to determine how and where the trainee 100 is applying force to the surrogate 20 in real time. Such synthesis may include determining the hands' and/or other objects overall coverage of the simulated wound 140. As explained below, the program 90 then uses this information to calculate its impact on the simulated wound 140 and simulated hemorrhaging blood 150.

The program 90 uses the geometry of the surrogate 20 and an appropriate hemodynamic model of the relevant portion of the body represented by the surrogate 20 to computationally calculate simulated blood hemorrhage characteristics.

The simulation of the behavior of blood coming from injured vessels within the wound 140 requires a combination of defining the extent of the vessel injuries, modeling the overall hemodynamic state of the simulated patient, and calculating the movement of the blood once it has left the vessels and moves upon the skin of the surrogate 20 and within the wound 140. Modeling vessel injury is straightforward, since geometric models of the vessels within the body are readily available and the definition of injury in terms of location and degree of violation of the integrity of the vessels is well understood since the amount of blood that travels through a given vessel that can escape directly correlates with size of defect in the vessel. How much blood is being pushed through the vessels is a function of the overall hemodynamic state of the simulated patient. There have been many mathematical models developed to estimate the overall body response to numerous systemic and pharmacologic insults with widely used open-source implementations of multi-compartment models of the cardiovascular system as well as a number of proprietary implementations embedded in human patient simulators as well as for license. So it is again a straightforward process to adapt either an open-source version or a commercial vendor-supported version of a hemodynamic simulation to drive the blood flow that is coming through the vessels that are injured. The hemodynamic model may incorporate not only systemic effects but also the system-wide propagation of localized effects coming from the trainee 100, such as his/her slowing or stopping a profusely bleeding vessel which had been having a profound effect on the overall cardiovascular system response. With the correct calculation of the volume and pressure of the blood that is exiting vessels whose location and orientation is known, the last calculation that to be carried out is to model the actual movement of the blood on the surface of the surrogate 20 and/or in the wound 140 represented on the surrogate 20. There has been extensive research and implementation of approaches to simulated accurate fluid movement in real-time. Multiple options exist for this with several open source implementations readily available. There have also been several simulations specifically of blood flow that can be leveraged. Finally, the recent expansion of the use of general-purpose graphics processor units (GPGPU) has made very powerful fluid representations quite practical on consumer-level computers. All of this combines to provide a very effective technology base for developing the simulation of blood within and around the wound.

The application of hemostatic agents in multiple physical forms (which can be real or surrogates as well) can be measured with the same camera system 50 and their specific influence upon the blood behavior computed by the program 90 based on the type of agent, the form of delivery, its location, the amount of force applied by the trainee 100, the length of application, etc.

The coagulation behavior of the hemorrhaging blood 150, both by itself or with the assistance of applied hemostatic agents, is computed by the program 90 and affects the physical behavior of the simulated blood 150 as well as its visual appearance.

Figure 2:
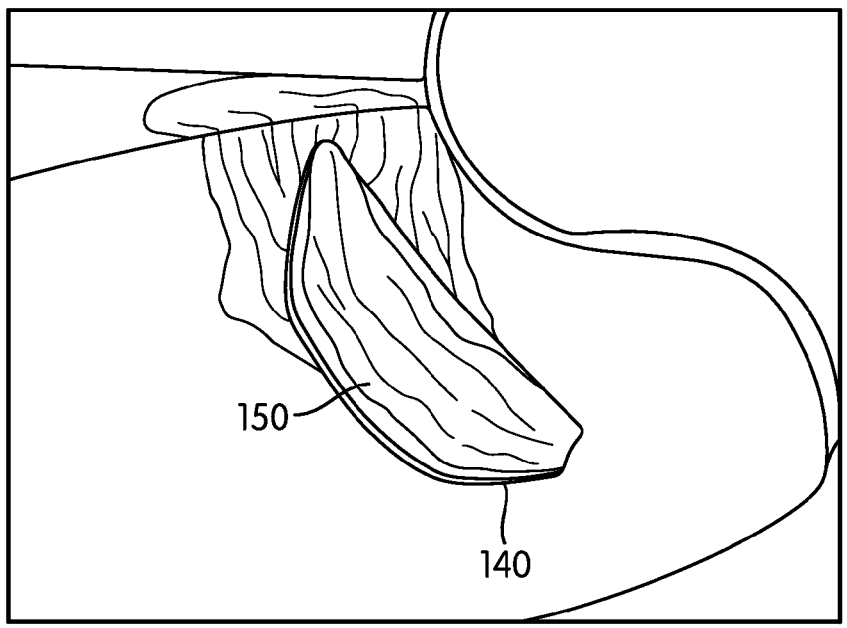
FIGS. 2 and 3 are images being displayed to the user at different times during use of the simulator of FIG. 1.
Figure 3:
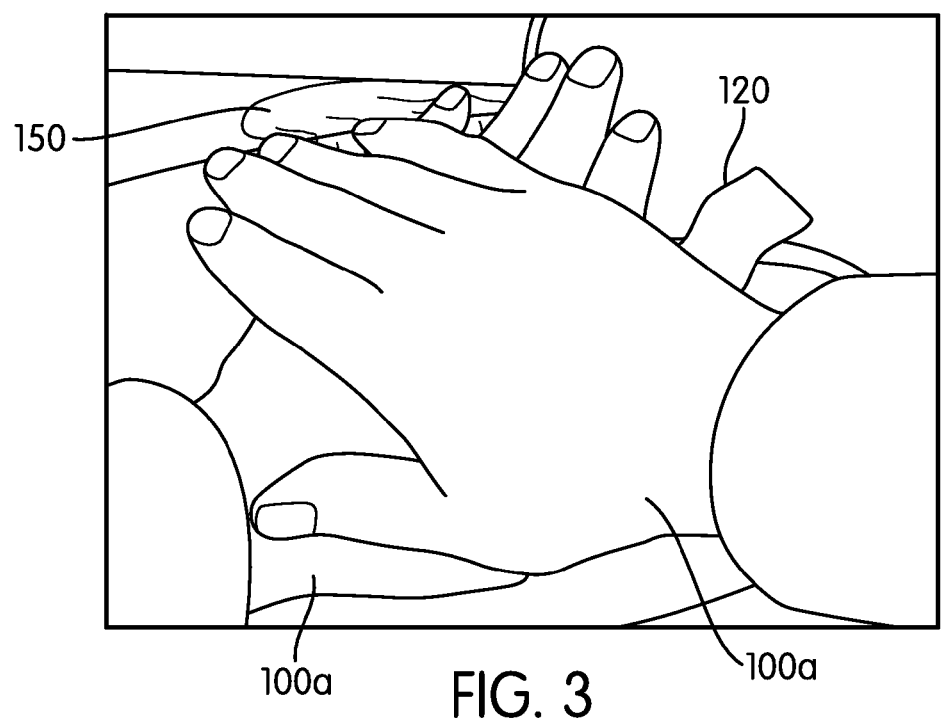

The program 90 generates a video signal representative of the simulated wound 140 and blood flow 150 based on one or more of the inputs and computations. The program 90 may scale a size of the simulated wound 140 and blood flow 150 from a parameterized model to the scale of the surrogate 20 so as to apply parameterized simulation to the potentially non-standard surrogate 20. As shown in FIG. 4, The program 90 then merges the input video feed provided by the camera 50a with the simulated blood flow 150 and simulated wound 140 and provides this merged output video feed to the display 40. FIGS. 2 and 3 are screen shots of the display 40 during use of the simulator 10. FIG. 2 illustrates the image on the display 40 when a simulated wound 140 and associated simulated hemorrhaging blood 150 is overlaid on the video feed provided by the camera 50a. FIG. 3 illustrates the image on the display 40 when the trainee's hands are interacting with the surrogate 20. Thus, the trainee 100 can see on the display 40 the real time-impact on the wound 140 and blood flow 150 of his/her interaction with the surrogate's simulated wound 140.

The input video feed from multiple cameras within the camera system 50a may be synthesized to change the viewpoint of the input video feed to match the viewpoint of the trainee. This creation of a synthesized viewpoint for the input video feed may be done in embodiments in which it is difficult or impossible to position a single camera to have the appropriate viewpoint.

Alternatively, the program 90 may itself generate the entire video feed to be presented via the display 40. In such an embodiment, the program 90 creates a video feed that includes the simulation's digitized recreation of objects being imaged, the simulated wound 140, and blood flow 150. Thus, either the actual imaged objects or the program's simulated view thereof may be incorporated into the output video feed presented on the display 40.

The program 90 may comprise any form that is usable by the processor 60 to carry out the functions of the program 90 (e.g., computer-executable code stored on any type of memory device, analog or digital circuitry connected to the processor 60, etc.).

The processor 60 may comprise any suitable processor for executing the program 90 (e.g., a PC, analog or digital circuitry). The processor 60 may comprise a plurality of sub-processors (e.g., a sub-processor dedicated to video rendering (e.g., a graphics-processor unit), a sub-processor dedicated to calculating the consequence of the detected interaction, etc.). The processor's sub-processors may be physically separated from each other without deviating from the scope of the present invention.

According to an embodiment of the invention, the trainee 100 wears pulse-feedback gloves 70 during use of the simulator 10. The gloves 70 include a pulse generator 80 (or multiple pulse generators) in one or more of the finger tips such that the magnitude, frequency, and rapidity of increase/decrease of pulse movement can be controlled by the simulator 10. The pulse generator 80 is operatively connected to the processor 60 such that the processor 60 can control the operation of the pulse generator 80.

The illustrated glove 70 surrounds the trainee's entire hand. However, a glove 70 according to an alternative embodiment may enclose or connect to less of the trainee's hand. For example, the glove 70 may be a finger glove that connects only to one of the trainee's fingers. Such a finger glove 70 need not even surround the trainee's entire finger. For example, the glove may comprise a front pad on which the pulse generator 80 and a heat generator 85 is positioned. One or more elastic bands may wrap around specific parts of the trainee's finger and pad to keep the pad against the front of the trainee's finger.

The heat generator 85 is operatively connected to and controlled by the processor 60. The program 90 may determine when the trainee's hand is in contact with the simulated patient, and responsively cause the heat generator 85 to generate heat so that the trainee feels the heat of the simulated patient's body and/or blood upon contact with the simulated patient and/or hemorrhaging blood. The heat generator 85 may comprise any suitable heat generator (e.g., electrical resistance heater, controlled exothermic chemical reaction heater, heat pump, etc.).

When the trainee 100 places his/her gloved hand on the surrogate 20, the location of the finger(s) over simulated vascular structures, combined with the current state of the hemodynamic simulation of the hemorrhagic patient as a result of the injury and whatever the trainee 100 has done thus far on the surrogate 20, will result in the program 90 calculating a simulated pulse. The processor 60 signals the pulse generator(s) 80 to exhibit the calculated simulated pulse. By combining the information from the load sensor 30 beneath the surrogate 20 with the finger location(s) detected by the camera system 50, the status of the injury, and the hemodynamic state, the specific feel of the pulse can be modified to reflect the strength of the trainee's pressing into the surrogate 20.

Figure 6:
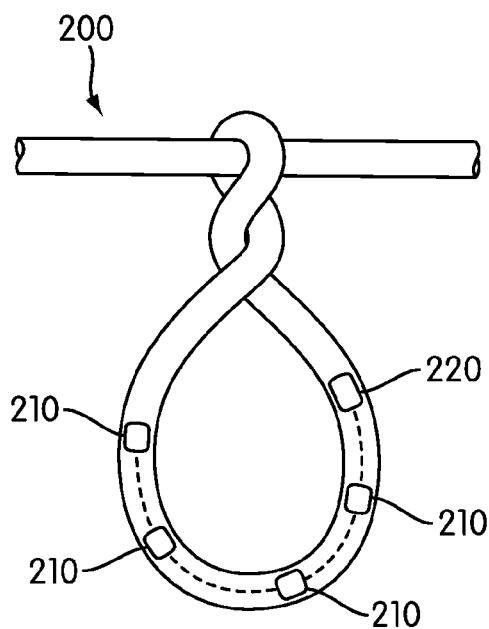
FIG. 6 is a view of a tourniquet according to an embodiment of the present invention.

As shown in FIG. 6, in the case of an extremity hemorrhage where application of a tourniquet 200 is possible and appropriate, a tourniquet 200 (either an actual tourniquet or a surrogate) can be used in which sensors 210 have been embedded that can sense the force in the tourniquet 200 and/or the force between the tourniquet and the surrogate 20 anatomy.

Combining this sensorized tourniquet 200 with a compact embedded wireless transmitter 220 and the camera-based measurement of the location of the tourniquet 200 will allow the magnitude of the trainee's tightening of the tourniquet 200 to be measured and sent as an input to the hemodynamic simulation that drives the simulated bleeding in the program 90. Accordingly, the processor 60 includes a receiver for receiving the signal generated by the transmitter 220. Alternatively, a wired connection between the pulse generator 80 and the processor 60 may be used to enable the program 90 to provide pulse generating instructions to the pulse generator 80.

Thus, the trainee 100 can treat a limb hemorrhage with a tourniquet 200 and observe the results on the augmented reality display in the same manner as the trainee 100 experienced when applying hemostatic agents.

Figure 5:
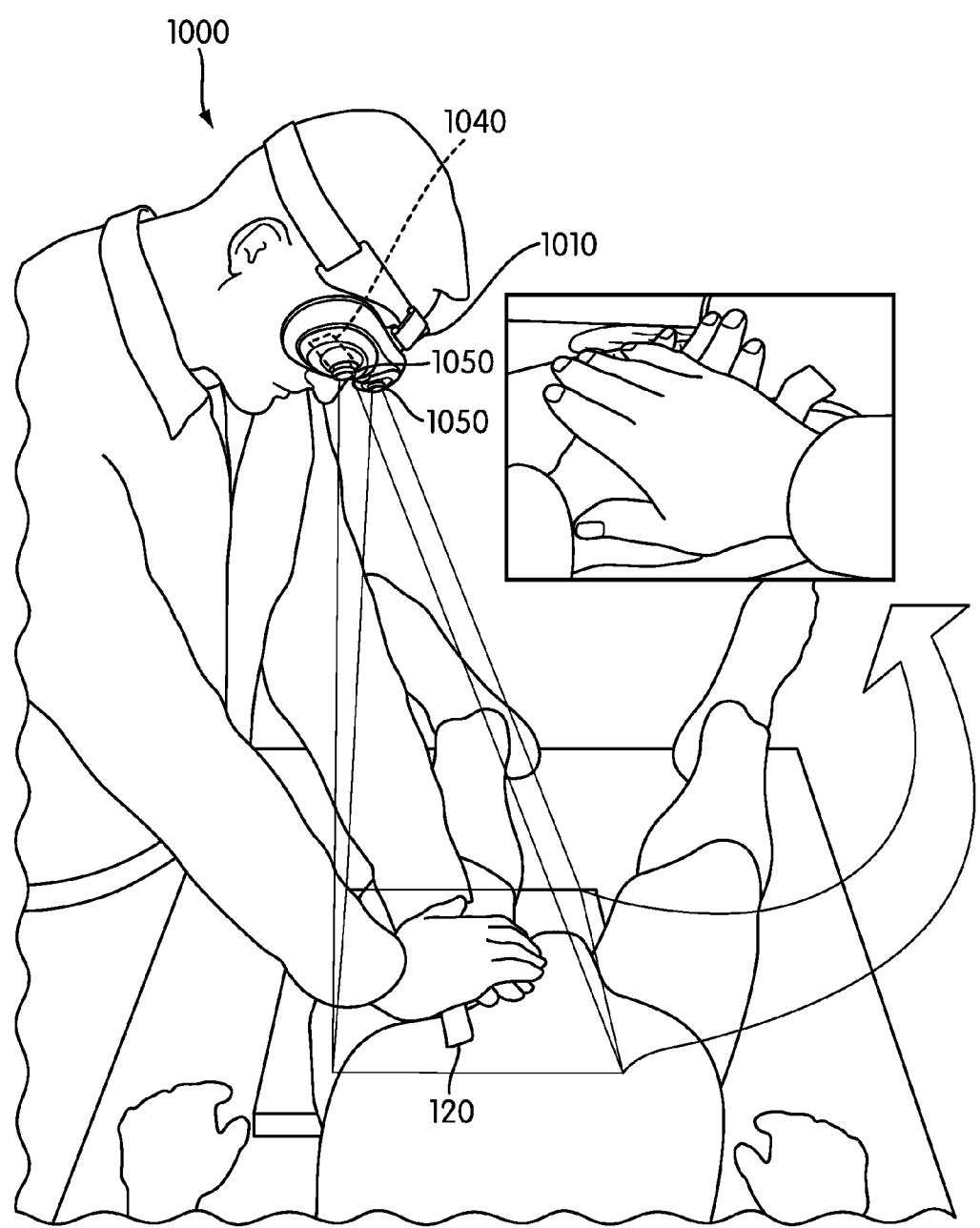
FIG. 5 is a perspective view of a user using a hemorrhage control simulator according to an alternative embodiment of the present invention.

FIG. 5 illustrates a hemorrhage control simulator 1000 according to an alternative embodiment of the present invention. The simulator 1000 is similar to the simulator 10, except that the display 40 and camera system 50 are incorporated into a head-mounted display 1010 (HMD), as is commonly used and understood in the field of augmented reality. This allows the trainee 100 to move about the surrogate 20 and the image he/she sees is adjusted accordingly in real time. As the trainee's point of view changes, so does the point of view of the camera system 1050. The point of view of the output video feed provided to the HMD's display 1040 changes in real time to match the trainee's head movements. The program 90 updates the video signal outputted by the simulation in real time so that the view of the simulated wound 140 and blood hemorrhage 150 also follows the trainee's movements to continue to synchronize with the merged video signal from the camera system 1050 and simulation. The display 1040 may be a stereo display that includes a separate video feed for each of the trainee's eyes. The program 90 may be configured to provide stereoscopic output video feeds to the display 1040 so that the trainee has 3D depth perception.

Because the simulated wound 140 is entirely generated by the program 90, different scenarios and wound types and locations can easily be simulated through the software without requiring multiple surrogates with different physical wounds. Because the simulated hemorrhaging blood 150 is entirely generated by the program 90 and merely displayed to the trainee 100 via the display 40, the use of messy, single-use, disposable actual blood surrogates (e.g., colored water) is advantageously avoided.

However, such actual blood surrogates could be added to the simulator 10 without deviation from the present invention.

Indeed, the program's hemodynamic simulation could be operatively connected to the actual blood flow generator to provide more hemodynamically correct blood flow than is possible with conventional simulators that do not utilize such a hemodynamic model driven simulation.

Because, according to one or more embodiments of the invention, many or all of the trainee's relevant movements/actions are measured and the resulting simulation outcomes recorded as well, objective, quantitative measures of the trainee's performance can be derived the physical variables that reflect the simulation. Additionally, each simulation can be recorded for later playback, analysis, and after-the-fact training with reference to the actions taken during the simulation.

This same information can be combined with intelligent tutoring systems to provide real-time mentoring so that the trainee can learn without the need for the presence of an instructor.

The program 90 may also be configured to enable an instructor to modify the scenario/simulated wound 140 in real time.

The instructor can observe the trainee remotely (e.g., via remote video feed of the video being streamed to the display 40) and provide feedback based on the same information measured for performance assessment as well as the instructor's typical use of visual observation of the trainee.

The program 90 may also be configured to provide instructional guidance cues provided by an instructor or automated tutor to point the trainee 100 to move the trainee's hands to the proper location (e.g., specific visual guidance overlaid on the output video feed provided to the display 40). For example, the program 90 may overlay on the display 40 semi-transparent, correctly positioned simulated hands, so that the trainee 10 may move his/her hands to match the correct position.

The simulator 10 may enable the extraction of objective measures of performance that can be used to assess trainee proficiency uniformly across instructors and institutions.

The processor 60 may comprise any suitable processor for running the simulation program 90. For example, the processor 60 may comprise a conventional personal computer, or may alternatively comprise a processor specifically built for quickly performing the numerous calculations involved in the simulation program 90. The processor 60 may include a one or more graphics processing units (GPUs). The processor 60 may include multiple cores for simultaneously processing a variety of computational threads associated with the use of the program 90. According to one embodiment, the processor 60 comprises two dual-core processors using a dual SLI graphics card system and an Ageia PhysX physics processor unit (PPU). The use of multiple processing cores and/or CPUs and/or PPUs and/or GPUS may give greater computational resolution/fidelity (graphical, temporal, etc.) to the program's simulation within the constraints of available computational power.

The simulation program 90 runs on the processor 10, and may be in any suitable form (e.g., program on a hard drive, CD, DVD, network server, etc., machine-readable medium encoded with machine-executable instructions executable by the processor 60) and format for a particular associated processor 60 (e.g., machine-readable medium for use on a processor 10 running DOS, WINDOWS, LINUX, a MAC OS, etc.). The program 90 may comprise a plurality of sub-programs (e.g., separate programs for (a) identifying the objects in the video feed from the camera 50a and determining such objects' location and orientation, (b) carrying out the computational simulation of the blood flow via a suitable hemodynamic model, and (c) rendering a point-of-view-appropriate visual representation of the trainee's actions' impact on the wound 140 and hemorrhaging blood 150 for merging with the video feed from the camera 50a to be provided to the display 40).

Figure 7:
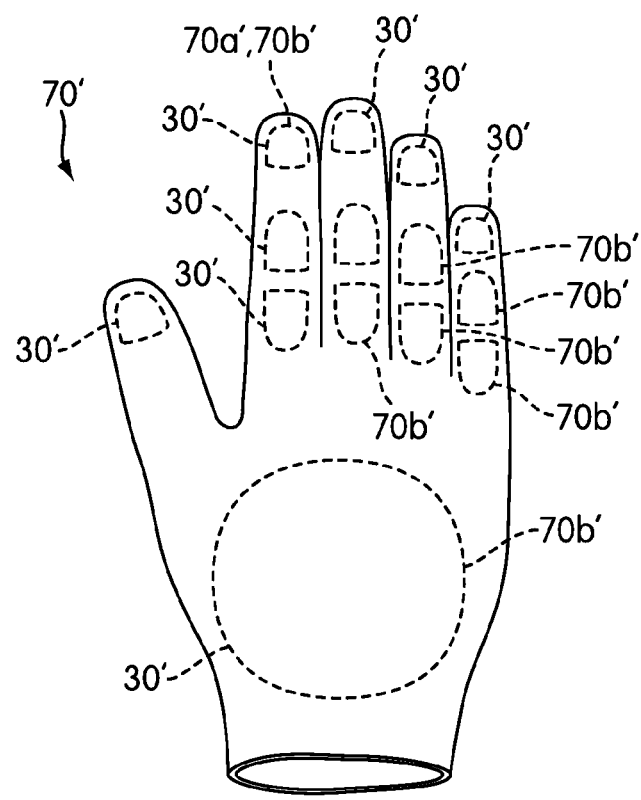
FIG. 7 is a perspective view of a sensorized glove according to an embodiment of the present invention.

As shown in FIG. 7, according to one or more embodiments, the gloves 70 may be replaced with gloves 70' that are similar to the gloves 70, but additionally include load sensors 30' incorporated into the gloves 70'. The load sensors 30' operatively connect to the processor 60 in a manner similar to the load sensors 30 (e.g., via cables, a wireless connection, etc.). The load sensors 30' may be used to determine forces applied by different parts of the trainee's hand to the surrogate 20. The load sensors 30' may comprise pressure sensors (e.g., MEMS or strain gauge), from which force can be calculated via integration over the area of the pressure sensor. The load sensors 30' may be placed in the thumb, each finger, and palm of the glove 70' to detect forces applied by the trainee's thumb, fingers, and palm, respectively. Alternatively, to simplify the simulation, the one or more load sensors 30' may be aggregated to determine the overall force being applied by the trainee's hand. The processor 60 may use the load signals provided by the load sensors 30' in combination with the glove 70' location information determined by the processor's analysis of the imaged glove 70' to precisely and accurately determine where and how the trainee is applying force to the surrogate 20. The processor 60 may combine data received from the load sensors 30' and load sensors 30 (if both sensors 30, 30' are used in a particular embodiment) to further refine the processor's force and location detection. According to one or more embodiments, the load sensors 30 are omitted when the glove(s) 70' and load sensors 30' are used.

As shown in FIG. 7, the gloves 70' include pulse generator(s) 70a', which are similar or identical to the pulse generators used by the gloves 70, and heat generators 70b', which are similar or identical to the heat generators 85 used by the gloves 70. If the pulse generator(s) 70a' interfere with signals of the sensors 30' (e.g., as might occur if the tip of the glove's pointer finger includes a physically overlapping sensor 30' and pulse generator 70a'), the processor 60 may be programmed to sense forces applied to the sensor 30' between pulses of the pulse generator(s) 70a' to eliminate or reduce the interference.

Figure 8:
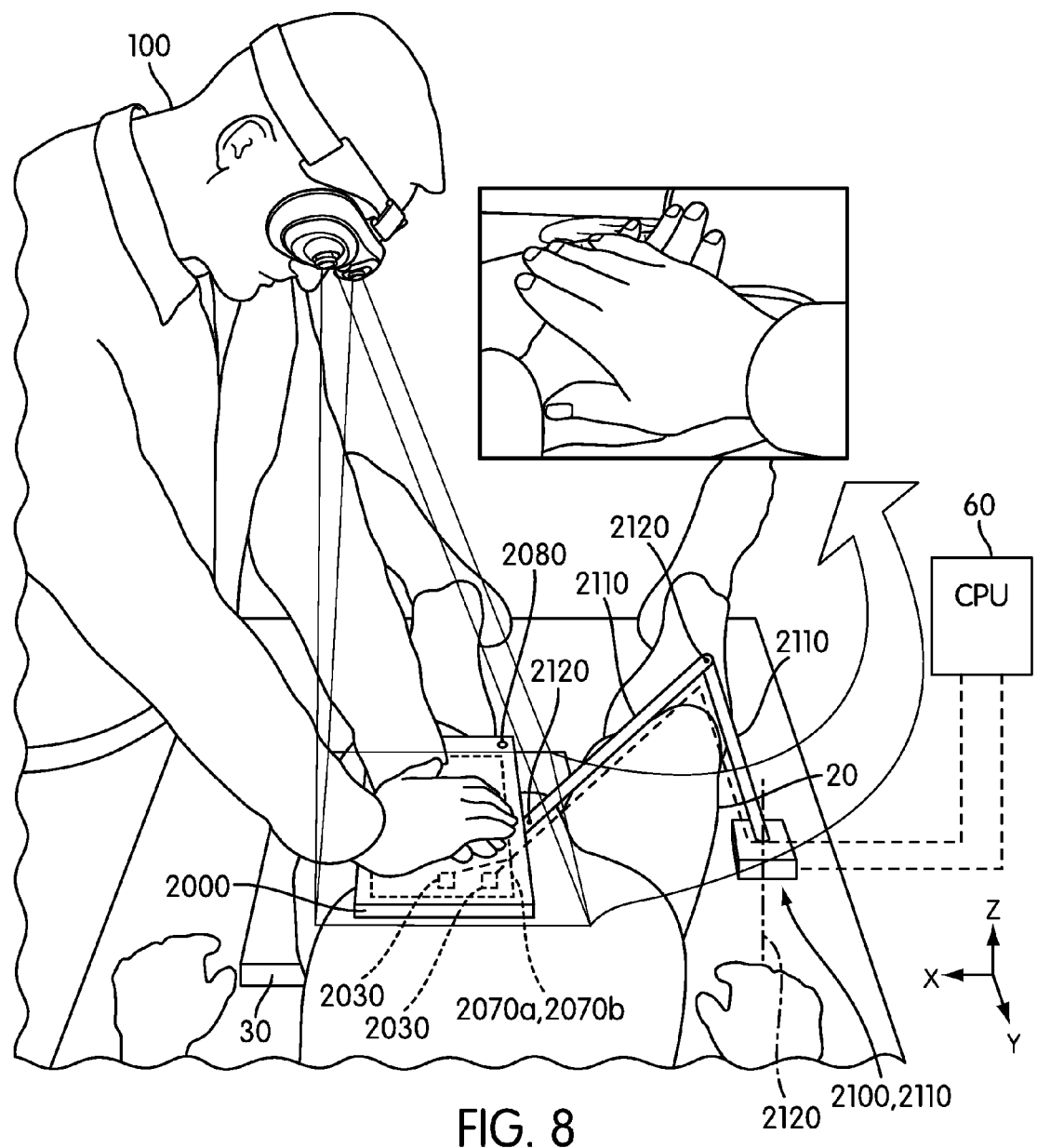
FIG. 8 is a perspective view of a user using a hemorrhage control simulator according to an alternative embodiment of the present invention.

As shown in FIG. 8, according to an alternative embodiment, the gloves 70' are replaced by a sensorized substrate 2000 and automated positioning device 2100. Load sensor(s) 2030, pulse generators 2070a, and heat generators 2070b are supported by the substrate 2000 (e.g., via mounting on a surface of the substrate 2000 or inside the substrate 2000). The load sensors 2030, pulse generators 2070a, and heat generators 2070b operatively connect to the processor 60 in the same or similar manner as the sensors 30, 30', pulse generators 70a', and heat generators 70b' discussed above.

The substrate 2000 mounts to the automated positioning device 2100, which in turn, either directly or indirectly, connects to the surrogate 20. For example, in the embodiment illustrated in FIG. 8, the device 210 mounts to a table on which the surrogate 20 is placed (e.g., gravity-based connection between the surrogate 20 and table). The device 2100 includes means for selectively positioning the substrate 2000 relative to the surrogate 20.

The device 2100 may act only in a contoured X/Y surface that follows the surface of the surrogate 20. For example, the device 2100 may be able to control the X/Y position of the substrate 2000, while gravity keeps the substrate 2000 generally in contact with the surrogate 20 in the Z direction. The substrate 2000 may be flexible enough that gravity causes it to generally conform to the underlying surface of the surrogate 20. Alternatively, the device 2100 may actively control the Z position (e.g., height) of the substrate 2000. In addition to X/Y/Z translational control, the device 2100 may also actively control the substrate 2000 about one or more rotational axes (e.g., about X/Y/Z axes).

In the illustrated embodiment, the device 2100 comprises a robotic arm in which a plurality of arm linkages 2110 are connected to each other for controlled relative pivotal movement about appropriate axes 2120. A detailed description of the robotic arm 2100 is omitted because those of ordinary skill in the art would be able to construct a suitable robotic arm in view of well known robotic arms (e.g., robotic arms used in manufacturing processes such as automobiles and semi-conductors, robotic arms such as those of remotely operated vehicles). Alternatively, the device 2100 may comprise any other suitable mechanism for controlling one or more degrees of freedom of the substrate. For example, a mechanism such as that used in an X/Y/Z cutter/plotter could be used in which nested trolleys move a printing/cutting head in the X, Y, and Z directions, respectively. The substrate 2000 could be mounted to such a plotter type device in place of the head/cutter, with suitable physical offsets so that the mechanism of the device does not interfere with the trainee's access to the surrogate 20. motorized gimbals or other types of pivotal connections could be added to control rotational directions.

The device 2100 connects to the processor 60 such that the processor 90 controls the operation of the device 2100. The program 90 may include code that locates a space between the at least one object (e.g., the trainee's hands) and the surrogate 20 and automatically controls the device 2100 so as to keep the substrate 2000 and its load sensor(s) 2030, pulse generator 2070a, and heat generator 2070b between the trainee's hand and the surrogate 20 in real time as the trainee 100 moves his/her hands. The program 90 may be programmed to determine which portion of the surface of the surrogate 20 (or skin/surface of the simulated patient) is closest to the at least one object (e.g., trainee's hand(s)) and cause the device 2100 to automatically move the substrate 2000 to that location on the surrogate 20. Thus, when the trainee 100 attempts to contact the surrogate 20, the trainee 100 actually contacts the sensorized substrate 2000 that becomes sandwiched between the trainee's hands and the surrogate 20.

The program 90 may filter the substrate 2000 and device 2100 out of the composite image sent to the display 40 such that the substrate 2000 and device 2100 are invisible to the trainee 100. Any suitable conventional mechanism for filtering objects out of video feeds may be used. For example, portions of the substrate 2000 and device 2100 that might enter the trainee's view could be colored a specific color that the program 90 is programmed to make transparent using known video filtering techniques.

The load sensors 2030, pulse generators 2070a, and heat generators 2070b function in substantially the same manner as the sensors 30, 30', pulse generators 70a', and heat generators 70b' discussed above. The program 90 may determine the precise location of the substrate 2000 and its sensors 2030, pulse generators 2070a, and heat generators 2070b via position encoders of the device 2100 and/or via analysis of the substrate 2000 as imaged by the camera system 50. If the camera system 50 is used, the substrate 200 may include registration marks 2080 or other indicia such as is used with the surrogate 20 so that the program 90 can determine the precise location of the substrate via the camera system 50. Additionally, the device 2100 may omit position encoders, and instead rely on a feedback loop that utilizes the program's determination of the position of the substrate 2000 to determine when and how to control the device 2100 to position the substrate 2000 in the desired position (e.g., between the trainee's hand and the surrogate 20).

The substrate 2000 may have any shape or size, but preferably covers an area that is at least slightly larger than the trainee's hand. The substrate 2000 may be generally sheet-like (e.g., having a width and length (which together create the area) that are much larger than its thickness). The area of the substrate 2000 may be rectangular, circular, oval shaped, or any other suitable shape. A circular shape may be advantageous if the device 2100 lacks pivotal control over the substrate 2000 and translational positioning of the substrate 2000 necessarily results in pivotal displacement of the substrate (e.g., a robotic arm that pivots about the Z axis to position the substrate 2000 within the X/Y plane/surface). The substrate 2000 material may include an elastic material that has the feel of human skin (e.g., rubber, material used for the skin of conventional mannequins, etc.).

A plurality of substrates 2000 and devices 2100 may be used when sensorized contact with the surrogate 20 is simultaneously desired in more than one area (e.g., one substrate 2000 and device 2100 for each hand of each trainee 100 participating in the simulation; a substrate 2000 and device 2100 for each simulated tool (e.g., tourniquet) to be applied to the surrogate 20).

The use of substrates 2000 and devices 2100 may enable the simulator 10 to accurately and precisely detect the interaction between the trainee 100 and the surrogate via the sensors 2030, and precisely and accurately provide haptic feedback to the trainee 100 via the pulse generators 2070a (and/or other haptic feedback devices such as the heat generators 2070b) without having to sensorize part or all of the surrogate 20. The substrate 2000 may be substantially smaller than the surrogate 20 or the simulated surface of the object being simulated. According to various embodiments, a surface area of the substrate 2000 that is used to simulate a surface of the simulated object is at least 3, 5, 7, 10, 20, and/or 50 or more times smaller than an area of the simulated surface of the simulated object.

In addition to or in the alternative to the pulse generators 2070a, the substrate 2000 may have other haptic devices. For example, a vibrator may be added to simulate shivering of a victim in shock or hypothermia. In addition to the heat generators 2070b, a cooler may be used to provide both hot and cold thermal feedback for the victim's simulated temperature.

Figure 12:
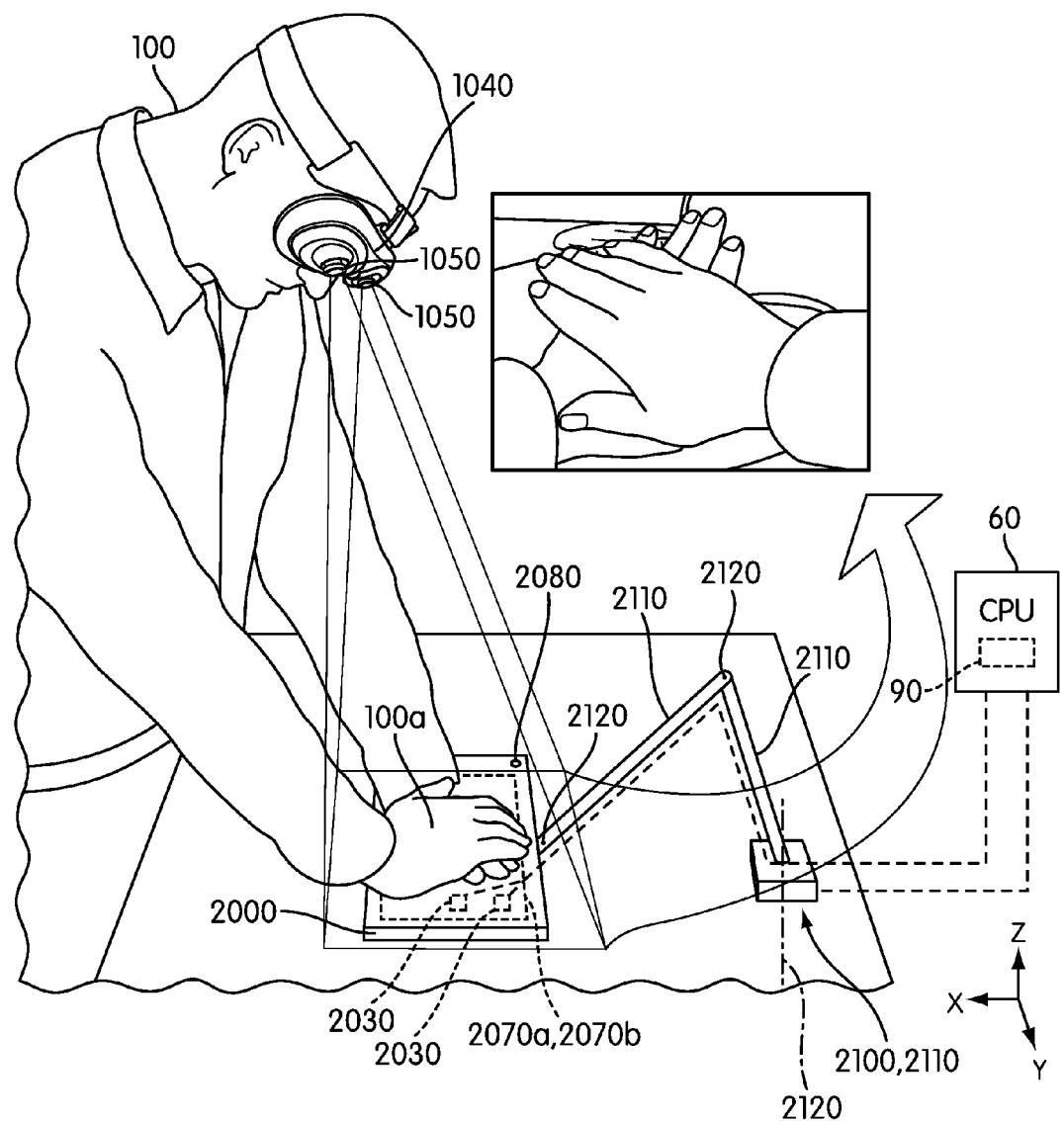
FIG. 12 is a perspective view of a user using a hemorrhage control simulator according to an alternative embodiment of the present invention.

According to an alternative embodiment of the present invention shown in FIG. 12 (which may look like the embodiment shown in FIG. 8 but without the surrogate 20 and load sensor 30), the substrate 2000 is the surrogate such that no additional surrogate (e.g., mannequin) is used. The program 90, processor 60, and device 2100 work together to position the substrate 2000 between the at least one object (e.g., the trainee's hands 100a, the gauze 120, a medical instrument) and the simulated surface/skin (e.g., under the at least one object) in the position where the simulated surface/skin of the simulated patient would be according to the simulation being run by the simulator. For example, the program 90 may control the device 2100 so as to constrain movement of the substrate 2000 so as to follow the simulated surface of the simulated patient, and be disposed as close as possible to the determined position of the at least one object (e.g., hands 100a) such that the at least one object will contact the substrate 2000 when the at least one object would contact the simulated surface of the simulated patient according to the simulation run by the program. The program 90 may be programmed to continuously cause the substrate 2000 to move so as to track the location of the at least one object.

Alternatively, the program 90 may be programmed to only move the substrate 2000 to a position proximate the at least one object when the at least one object comes within a predetermined distance threshold of the simulated surface. The predetermined threshold may be ½ inch, 1 inch, 2 inches, 5 inches or more (or may be infinity such that the program 90 always actively controls the position of the substrate 2000). The predetermined threshold may be the largest distance that the program 90 can detect (e.g., the largest distance in which the at least one object is visible within the input video feed) such that the program 90 controls the position of the substrate 2000 whenever it detects the presence of the at least one object. Alternatively, the threshold may be 0 or nearly 0 such that the program 90 only moves the substrate 2000 into position when contact between the at least one object and the simulated surface is determined to be imminent.

The program 90 may be programmed to not constrain movement of the substrate 2000 to the simulated surface except when the at least one object is within the predetermined threshold distance of the simulated surface. Accordingly, the substrate 2000 may move over and under simulated surface in order to best and timely move to a position where contact between the at least one object and the simulated surface is likely to occur.

A plurality of substrates 2000 and automated positioning devices 2100 may work together to provide a continuously perceptible surface as the at least one object moves along the simulated surface. For example, the program 90 may be programmed to cause multiple substrates 2000 to leapfrog each other as the at least one object moves across the simulated surface via successive substrates 2000. The program 90 may cause a substrate 2000 that is not currently in contact with the at least one object to move to a position along the simulated surface that (a) abuts a substrate 2000 that is in contract with the at least one object, (b) is closest to the at least one object, and (c) is oriented to provide an appropriately perceived transition in the slope and/or level of the surface felt by the at least one object as it encounters the substrate.

Additionally and/or alternatively, the surface of the substrate 2000 may be selectively movable and its height adjustable relative to the remainder of the substrate 2000 (e.g, like the surface of a trackball or conveyor belt) such that the substrate 2000 can move along the simulated surface to track the at least one object while keeping the surface of the substrate 2000 stationary at the point of contact with the at least one object.

The trainee's view of the simulated patient according to the embodiment illustrated in FIG. 12 may be entirely created by the program 90 and processor 60 and displayed to the trainee 100 via the display 40. An embodiment in which the substrate 2000 remains relatively flat/planar is well suited for simulating relatively flat portions of a simulated patient (e.g., abdomen, back, etc.). According to yet another embodiment, the processor 60, program 90, and suitable physical actuators connected to the substrate 2000 actively control the surface contour(s) of the substrate 2000 to mimic the surface contours of the corresponding portion of the simulated patient. For example, tensile actuators may extend across the substrate so as to control a convexity of the substrate 2000 like the string on an archery bow. Additionally and/or alternatively, a plurality of actuators such a linear ball/lead screws or shaped memory alloy could be disposed under the elastically deformable surface of the substrate 2000 and be actively controllable so as to push specific portions of the surface of the substrate 2000 upwardly or downwardly so as to conform to the simulated surface of the simulated object. A convexly shaped substrate 2000 may be used to simulate an arm or leg of the simulated patient.

In the illustrated embodiments, the simulator 10 includes a display 40 for a single user. However, according to an alternative embodiment, multiple trainees 100 may each use a discrete display 40 and camera system 50 so that each trainee 100 can view the shared simulation and surrogate 20 from their own distinct point of view. Each trainee's display 40 and camera system 50 may be operatively connected to the centrally run program 90 via a suitable connection (e.g., wired or wireless network (e.g., cellular, mobile, wifi, etc.)). The program 90 generates the composite video feed for each trainee's display 40 in the same or similar manner as described above in connection with the single-trainee-perspective embodiment. According to various embodiments, the display 40 and camera system 50 may be the display and camera system of a video-enabled smartphone, an Apple iPad with an attached or embedded video camera, or another similar device. According to various embodiments, a main trainee 100 who directly interacts with the surrogate 20 may use a high resolution display 40 and camera system 50, while other viewing trainees 100 may use lower resolution, lower speed, and/or lower quality displays 40 and camera systems 50. Such viewing trainees 100 may hold their combined display 40 and camera 50 devices up between themselves and the surrogate 20 in order to view the simulation from their own perspective.

Additionally and/or alternatively, viewing and/or actively involved trainees 100 can be in different rooms/locations while still sharing in the simulated experience. For example, the video or simulation state feed seen by an active trainee can be transmitted to other locations (e.g., other rooms, buildings, etc.). Viewing trainees 100 can use discrete surrogates 20 that are similar to the surrogate 20 being used by the active trainee. The program 90 can be programmed to transfer the relevant video images/simulation state to the viewing trainee's surrogate (e.g., projecting the active trainee's hands and the simulated wound/blood onto the viewing trainee's surrogate 20). Additionally and/or alternatively, multiple active trainees can interact with one or more surrogates 20 and the program 90 can aggregate the simulated interactions so that each trainee sees the other trainees' actions (e.g., via video feed of the other trainee's hands) and effects on the simulated patient. Using one or more of such principles, a plurality of trainees/participants can view different surrogates 20 and/or displays 40 and share the experience of interaction on what appears to everyone involved to be the same simulated patient.

While the illustrated simulator 10 is a hemorrhage control simulator, one or more embodiments of the present invention may alternatively simulate other scenarios, objects, etc. For example, the surrogate 20 may be a surrogate for an object other than a human body (e.g., an animal body, a mechanical device, an object that is part of an AR game). For example, in the context of an AR game, the surrogate 20 may a part of the game and not be a surrogate for any other specific object than itself. The user plays the game by interacting with the surrogate. Haptic feedback (e.g., from the gloves 70, 70', substrate 2000) may guide the user or provide instructions on what to do next. Thus, one or more embodiments of the present invention may be used in any situation where it is desired to provide interaction between a person (or other object) and a surrogate for another object, while measuring the interaction and/or providing haptic feedback.

According to one or more embodiments, the surrogate 20 is the actual object whose interaction with the user is being simulated. For example, in the medical training context, the surrogate 20 may be an actual person (e.g., another trainee), instead of a mannequin. If the simulator 10 is simulating interaction between a user and an object in a fictional game, the surrogate 20 may be the actual object in the game.

While the illustrated embodiments are designed primarily for interaction between a trainee's hand(s) and the surrogate 20, one or more embodiments of the present invention may additionally and/or alternatively be used to simulate interaction between the surrogate 20 and some other object than the trainee's hand(s) (e.g., a trainee's surgical instrument, a trainee's medical instrument, a hand tool, a probe, a measuring device (e.g., thermometer), a game piece used in a game based on interaction between the game piece and the surrogate, etc.).

Simulators 10 according to various embodiments of the present invention preferably operate in real time. As used herein, the term "real time" does not require instantaneous computations and user feedback. Rather, "real time" merely means that the simulator provides visual, haptic, and/or other feedback to the user relatively soon after the user provides an input (e.g., within 1 second, within ⅕ of a second, within ⅒ of a second, within ⅟₁₅ of a second, within ⅟₂₀ of a second, within ⅟₃₀ of a second, within ⅟₆₀ of a second, within ⅟₁₀₀ of a second, within between ⅕ and ⅟₁₀₀ of a second) and provides it at an update rate that is perceptually relatively smooth. Such computational speed preferably provides a meaningful interactive simulation experience. According to one embodiment, the simulator 10 provides visual feedback within under 100 ms of the trainee's interaction with the surrogate 20 and at an update rate of at least 15 Hz or at least 30 Hz. Another embodiment would provide haptic feedback response to user interaction in less than 100 ms. In general, the lag time and frame rate is preferably consistent with human perceptual capabilities (or relatively close thereto) and preferably does not vary over the course of the simulation to the point where the user can sense something is not as it should be.

Figure 9:
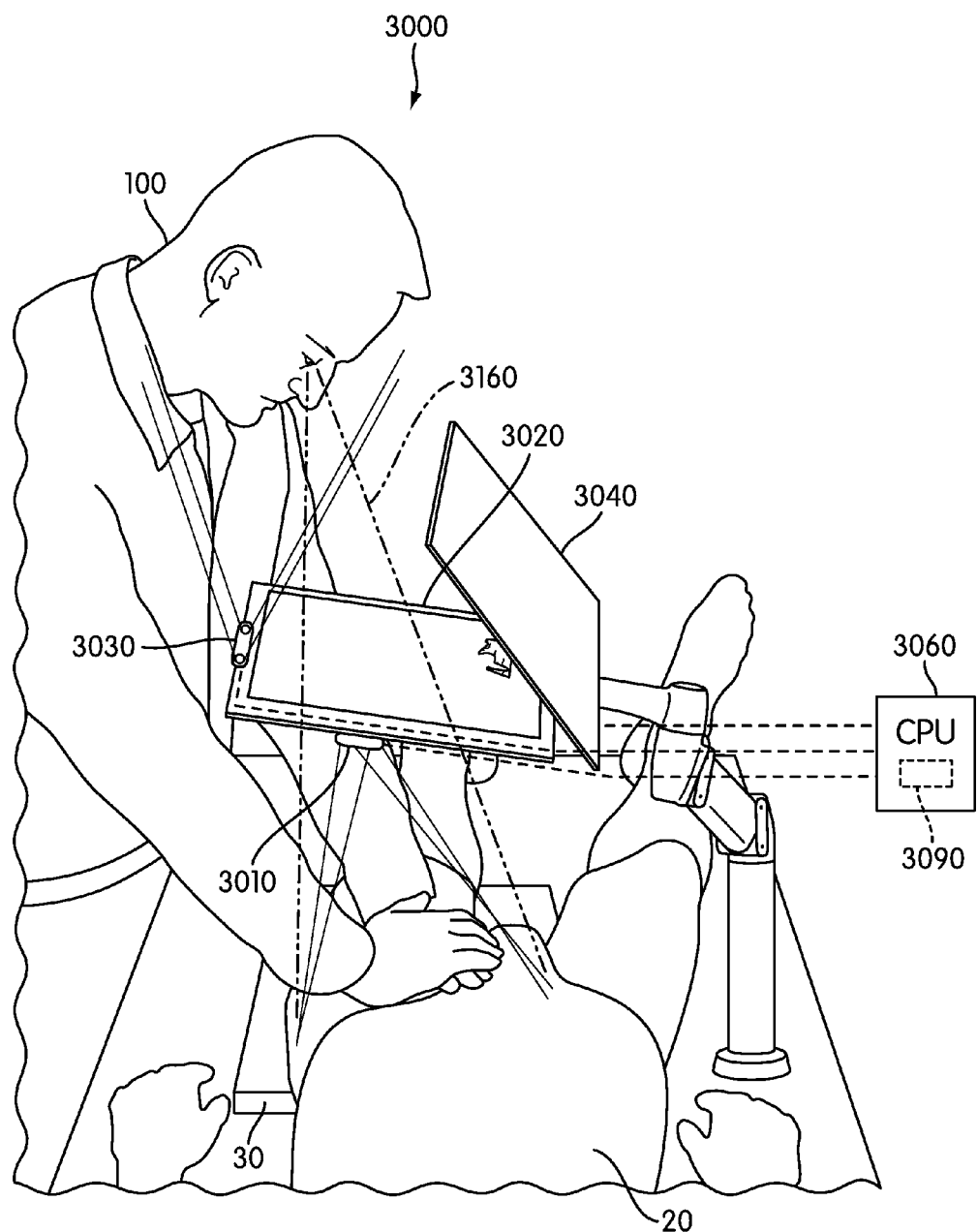
FIG. 9 is a perspective view of a user using a hemorrhage control simulator according to an alternative embodiment of the present invention.
Figure 10:
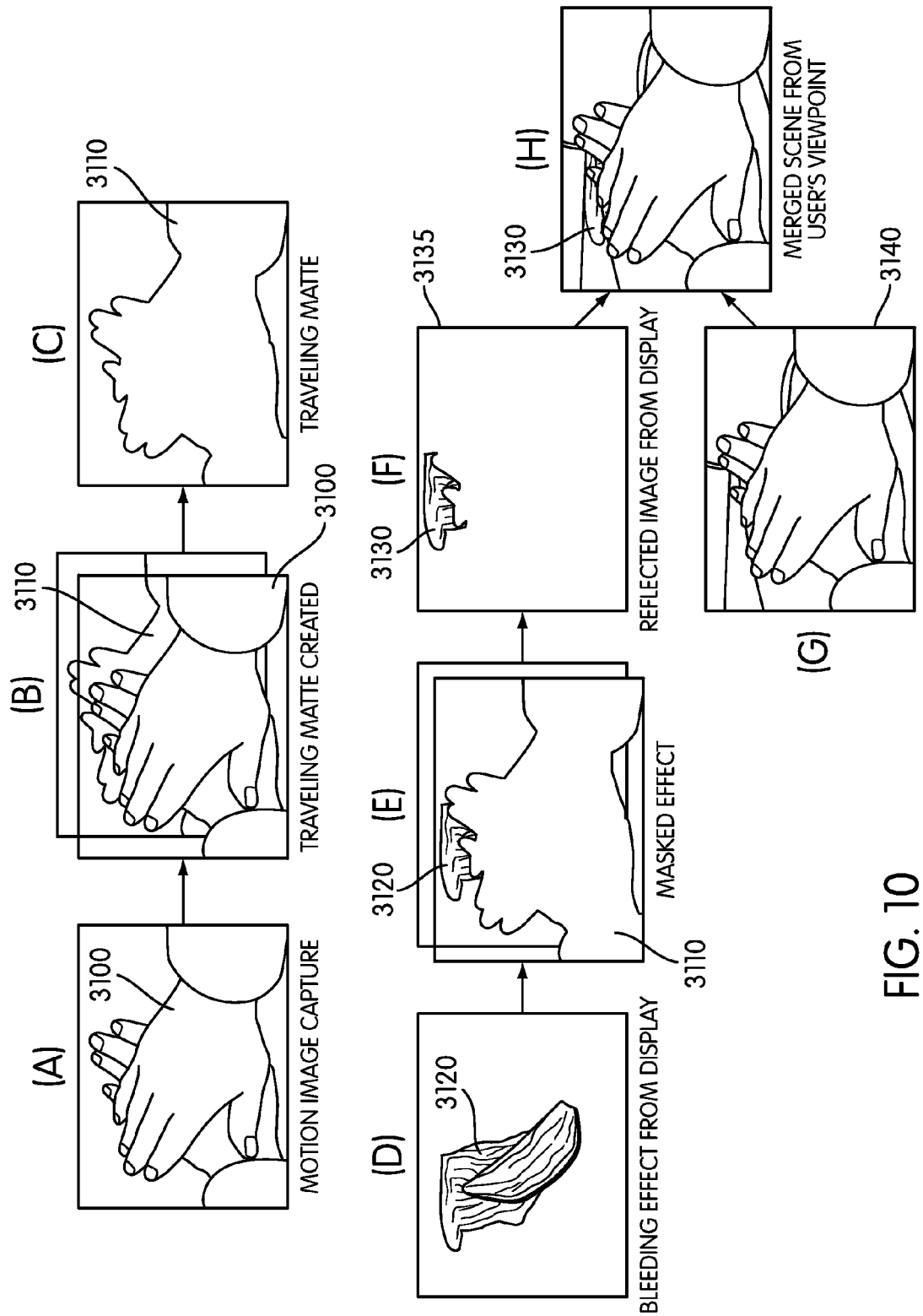
FIGS. 10(A)-(H) illustrate how the trainee's view of a simulated wound and a surrogate are merged according to the embodiment illustrated in FIG. 9.

FIGS. 9-10 illustrate a simulator 3000 according to an alternative embodiment of the present invention. The simulator 3000 is similar to the simulator 10 except that, as explained below, the trainee 100 views his/her actual hands and the surrogate 20 through a partial mirror 3020 (e.g., 2 way mirror, half-mirror), instead of a video image of his/her hands and the surrogate 20. Redundant descriptions of features of the simulator 3000 that are substantially similar to or identical to features of the simulator 10 are omitted.

As shown in FIG. 9, instead of including a display 40 and camera system 50 as in the simulator 10, the simulator 3000 includes a surrogate camera system 3010, a partial mirror 3020 a trainee camera system 3030, a video display 3040, a processor 3060, and a program 3090.

The camera systems 3010, 3030 are each capable of detecting objects in three dimensions (e.g., using any of the methods discussed above with respect to the camera system 50). The camera systems 3010, 3030 are mounted to the partial mirror 3020 (or any other suitable position). The camera system 3030 aims toward where the trainee's head/eyes should be disposed during use of the simulator 3000. The camera system 3010 aims toward the relevant part of the surrogate 20 in the same manner as discussed above with respect to the camera system 50. According to various embodiments, the camera systems 3010, 3030 each comprise a Minoru3d stereo camera system, a Point Grey BumbleBee, or a Videre STOC/STH. According to other embodiments, the camera systems 3010, 3030 each comprise a depth measuring camera system such as CanestaVision and SwissRanger.

The processor 3060 and program 3090 are similar to the processor 60 and program 90 discussed above. The camera systems 3010, 3030, display 3040, and/or other features described above (e.g., load sensors 30, 30', 210, 2030, pulse generators 2070a) operatively connect to the processor 3060 and program 3090 (e.g., via wired or wireless connections).

The program 3090 works in much the same way as the program 90. However, unlike the program 90, the output video feed generated by the program 3090 includes only the simulated wound and blood only, and only to the extent that a view of the wound and blood would not be obstructed by the trainee's hands or other objects. It does not include the surrogate 20 or the trainee's hands or other objects.

FIGS. 10(A)-(H) sequentially illustrate how the program 3090 generates the output video feed displayed by the display 3040. As shown in FIGS. 10(A)-(C), the program 3090 uses the input video feed from the camera system 3010 to identify the trainee's hands and other objects that move relative to the surrogate 20 (e.g., hemostatic bandages, medical instruments, etc.). As shown in FIG. 10(C), the program 3090 converts these moving hand images 3100 into a traveling matte 3110. As shown in FIG. 10(D), the program 3090 generates a simulated wound/blood 3120 in the same or similar manner as discussed above with respect to the program 90 and simulated wound 140 and blood 150. As shown in FIG. 10(E), the program 3090 overlays the travelling matte on the simulated wound/blood 3120 to mask any part of the wound/blood 3120 that would be obscured from the trainee's view by the trainee's hands (or other objects). As shown in FIG. 10(F), the program 3090 then eliminates the masked portion of the simulated wound/blood 3120 to create an unmasked portion of the simulated wound/blood 3130. The program 3090 generates an output video feed 3135 of just this unmasked portion of the simulated wound/blood 3130 and sends this output video feed 3135 to the display 3040 in real time. Thus, FIG. 10(F) illustrates the output video feed 3135 displayed on the display 3040. Thus, even though the simulated wound/blood 3130 is being displayed to the trainee 100 on top of the trainee's hands, the simulated wound/blood 3130 will appear to the trainee to be underneath the trainee's hands.

As shown in FIG. 9, as the trainee 100 looks at the surrogate 20 through the partial mirror 3020, the visual rendering of the unmasked portion of the simulated wound/blood 3130 is reflected from the display 3040 off of the partial mirror 3020 to the trainee. As shown in FIG. 10(H), the partial mirror merges this visual rendering of the unmasked portion of the simulated wound/blood 3130 (FIG. 10(F)) with the trainee's actual view 3140 of the surrogate 20 and his hands (shown in FIG. 10(G)) to provide the trainee with a composite view that includes both.

The output video feed 3135 is generated as a mirror image of the trainee's intended view so as to account for the mirror effect of the partial mirror 3020.

Although parts of the output video feed 3135 outside of the unmasked portion 3130 of the simulated wound/blood are shown in white in FIG. 10(F), such background portions would be displayed in black on the display 3040 to prevent their reflection from obstructing the trainee's view of the surrogate 20, hands, and other objects.

As shown in FIG. 9, the camera system 3030 aims at the trainee's head. The program 3090 uses the camera system 3030 to detect the three-dimensional position of the trainee's eyes and/or direction of viewing. Conventional facial recognition and position analysis software may be used to detect the eyes and/or their viewing direction and location. The program 3090 uses this information, as well as information from the camera system 3010, and other position information (e.g., the relative positions of the mirror 3020, display 3040, camera systems 3010, 3030, surrogate 20) to correctly position and size the output video feed 3135 so as to properly synchronize with the trainee's view 3140 of the surrogate 20 so as to all be along a common line of sight 3160.

According to one or more embodiments, the reference frame used by the simulator is based on the display 3040. Because the camera systems 3010 and 3030 are rigidly mounted to the display 3040 (via the mirror 3020), the program can easily and quickly update the output video feed 3135 to accommodate movement of the display 304o and/or movement of the trainee 100.

The simulator 10 may also include such a camera system 3030 so as to help the program 90 properly align the output video image (shown in FIG. 3) relative to the trainee's eyes and the surrogate 20.

Any of the above-discussed camera systems 50, 1050, 3010 and corresponding displays 40, 1040, 3040 may provide mono video (2D video) or stereo video (3D video) using any suitable stereo video mechanism. The use of stereo video is preferred to provide additional depth cues to the trainee 100. However, a mono version could also be used to lower the cost and lessen the need for eyewear such as polarized light glasses or shuttered glasses to produce the stereo image. In certain stereo image embodiments, the camera systems are preferably disposed near or along the trainee's line of sight so as to better approximate the correct stereo image for the trainee 100. The stereo embodiment is well suited for the simulator 1000 illustrated in FIG. 5, in which the camera system 1050 already includes a camera for each eye that is in the direct line of sight of each of the trainee's eyes, and in which the display 1040 includes a corresponding discrete display for each of the trainee's eyes. In the simulator 3000 illustrated in FIG. 9, the image displayed on the partial mirror 3020 can be either stereo or mono when it is appropriately aligned with the user's line of sight as measured by stereo camera(s) 3030.

Figure 11:
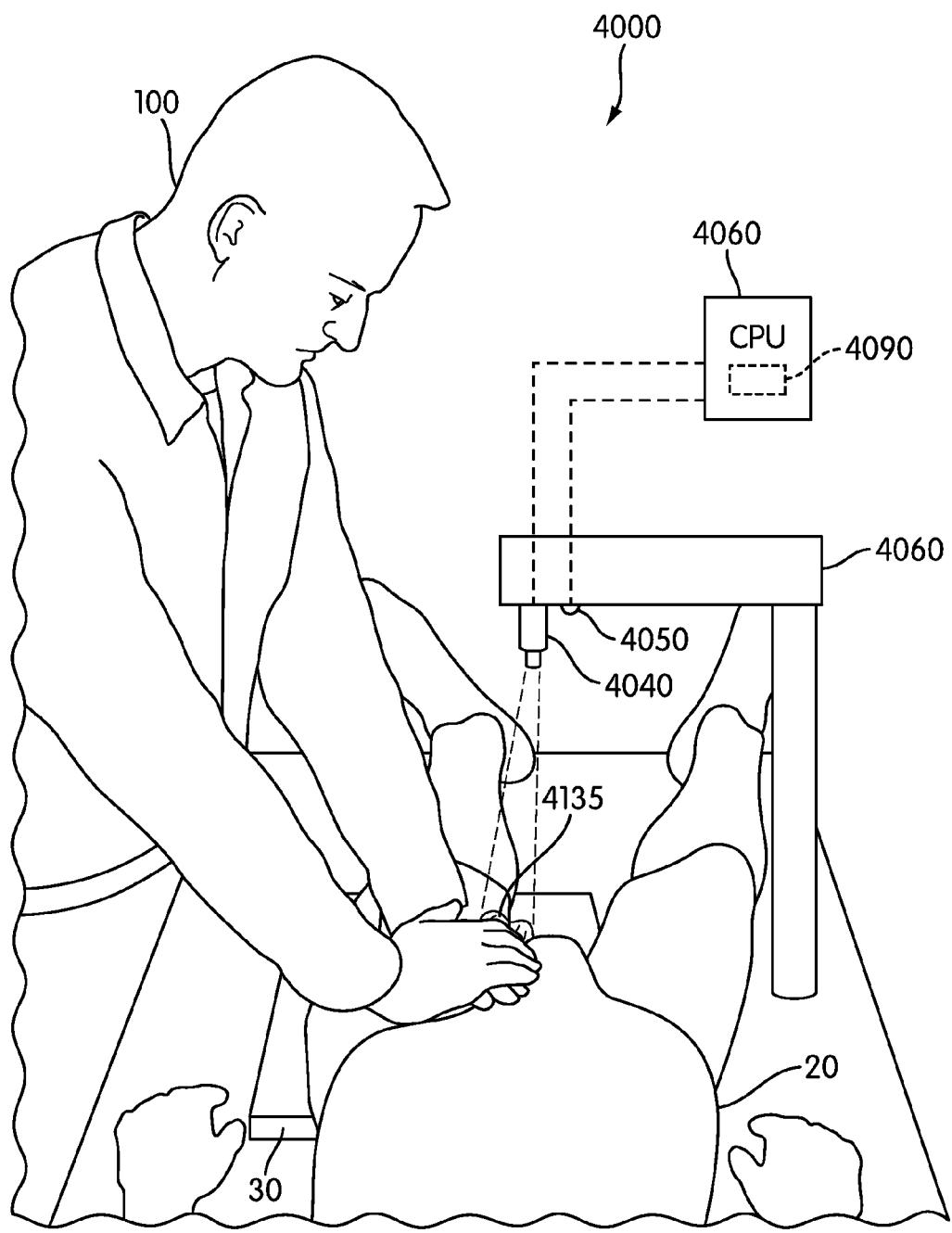
FIG. 11 is a perspective view of a user using a hemorrhage control simulator according to an alternative embodiment of the present invention.

FIG. 11 illustrates a simulator 4000 according to an alternative embodiment of the present invention, which is similar to the simulator 3000, but relies on a projector display 4040 as the display, rather than a partial mirror 3020 and a LCD type display 3040. The simulator 4000 includes a camera system 4050 and projector display 4040, which are both aimed at the relevant portion of the surrogate 20, e.g., via mounting to a fixed or movable arm 4060, which in turn mounts to a table on which the surrogate 20 is positioned. The camera system 4050 is similar or identical to the camera system 50, and serves the same purpose. The view points of two or three of the camera system 4050, projector display 4040, and trainee 100 are preferably aligned as much as possible. According to an alternative embodiment of the present invention, the camera system 4050 and projector display 4040 are mounted to the trainee's head (e.g., via forehead straps or goggles similar to the embodiment shown in FIG. 5).

The processor 4060 and program 4090 work in substantially the same manner as the above-discussed processor 3060 and program 3090. However, instead of sending the output video feed 3135 to an LCD display and partial mirror 3020, the projector display 4040 projects an output video feed 4135 (like the output video feed 3135) directly onto the surrogate 20, using the surrogate 20 as a projection screen for the projector display 4040. The program 4090 uses appropriate calculations/determinations such that the output video feed 4135 is properly positioned and sized on the surrogate 20. For example, the program 4090 may expand, compress, and warp various portions of the simulated wound/blood in the output video feed 4135 to accommodate for the non-planar surrogate surface onto which the feed 4135 is projected and prevent distortion on the curved surrogate "screen."

The projector display 4040 is preferably a high intensity/brightness display 4040 so that the projected video feed 4135 of the simulated wound/blood is easily visible on the surrogate 20.

According to various embodiments of the present invention, the edges of the simulated wound/blood of the output video feeds 3135, 4135 is gradually fade to transparency. Such blurred edges help to obscure dithering between the positioning of the video feed 3135, 4135 and its correct positioning relative to the surrogate 20 and view point of the trainee 100. Such blurred edges also tend to help obscure any inaccuracies in the program's calculation of the correct position of the simulated wound/blood within the video feeds 3135, 4135.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A simulator comprising:
   a physical surrogate for a portion of a simulated human patient, the surrogate having a surface feature of a portion of a human body;
   a camera system aimed at the surrogate to generate an input video feed;
   a processor having a program embodied in a non-transitory computer readable medium operatively connected to the camera system, wherein the program is programmed to create a simulation of an interaction between at least one object and the simulated patient, the program being programmed to, in real time:
   receive the input video feed,
   determine, based at least in part on the input video feed, a location of the surrogate and the at least one object,
   detect an interaction between the at least one object and the surrogate based at least in part on the determined location of the surrogate and the at least one object,
   generate a simulated hemodynamic consequence of the detected interaction between the at least one object and the surrogate based on a computational model of a human body's hemodynamic system,
   generate a simulated location and appearance of the simulated hemodynamic consequence on the simulated human patient,
   identify a portion of the simulated hemodynamic consequence that is not obstructed from a user's view according to the simulation,
   generate a visual rendering of the portion of the appearance of the simulated hemodynamic consequence,
   determine from the simulated location of the simulated hemodynamic consequence a corresponding position of the visual rendering relative to the surrogate, and
   generate an output video feed that comprises at least the visual rendering; and
   a display operatively connected to the processor and configured to display the output video feed so that the visual rendering is viewable along a line of sight toward the position of the visual rendering relative to the surrogate.

2. The simulator of claim 1, wherein the display comprises a projector display that is positioned and configured to project the visual rendering onto the position of the visual rendering relative to the surrogate.

3. The simulator of claim 1, wherein:
   the display comprises a video display and a partial mirror, the partial mirror being configured and positioned so as to be along the line of sight such that both the surrogate and position of the visual rendering relative to the surrogate can be viewed through the partial mirror, the video display is operatively connected to the processor and configured to display the output video feed, and the video display is positioned relative to the partial mirror such that during use the visual rendering is reflected off of the partial mirror from the video display to the user along the line of sight such that the visual rendering appears to the user to be disposed at the position of the visual rendering relative to the surrogate.

4. The simulator of claim 1, wherein:

the program is programmed to, in real time, overlay the visual rendering onto the input video feed to generate the output video feed;

the display is positioned so as to be interposed between the user and the position of the visual rendering relative to the surrogate.

5. The simulator of claim 1, wherein:

the simulator further comprises a load sensor operatively connected to and disposed underneath the surrogate to generate a load signal representative of a sensed load applied to the surrogate via the at least one object and transferred to the load sensor via the surrogate, the processor and program are operatively connected to the load sensor, and the program is programmed to, in real time receive the load signal, and detect the interaction between the at least one object and the surrogate based at least in part on the load signal.

6. The simulator of claim 5, wherein the program is programmed to, in real time, detect a magnitude, location, and direction of force being applied to the surrogate by the at least one object based at least in part on the load signal.

7. The simulator of claim 5, wherein:

the program is programmed to create the simulation so as to simulate an interaction between the at least one object and a simulated wound on the simulated patient, the location and appearance of the simulated hemodynamic consequence comprises the location and appearance of the simulated wound and simulated blood flow from the simulated wound, the program is programmed to, in real time; generate the location and appearance of the simulated wound and simulated blood flow based on the computational model, the determined location of the surrogate and the at least one object, and the load signal.

8. The simulator of claim 7, further comprising:

a physical representation of a tourniquet; and a force sensor operatively connected to the physical representation of a tourniquet to generate a tourniquet force signal representative of a force being applied by the tourniquet to the surrogate;

wherein the force sensor is operatively connected to the processor to provide the tourniquet force signal to the processor and the program, and wherein the program is programmed to generate the location and appearance of the simulated wound and simulated blood flow from the simulated wound based on the tourniquet force signal.

9. The simulator of claim 1, wherein:

the simulator further comprises a haptic output device configured and arranged to be disposed between the at least one object and the surrogate, the haptic output device is operatively connected to the processor, the program is programmed to, in real time, cause the haptic output device to generate haptic feedback based, at least in part, on the detected interaction between the at least one object and the surrogate.

10. The simulator of claim 9, wherein:

the haptic output device compromises a heat generator, and the haptic feedback comprises heat.

11. The simulator of claim 9, further comprising a glove configured to be worn by the user, wherein the haptic output device is connected to the glove such that the haptic feedback is manually detectable by the user's hand when wearing the glove.

12. The simulator of claim 1, further comprising a glove comprising a pulse generator configured to receive a simulated pulse signal and generate a pulse representative of the simulated pulse signal, wherein the generated pulse is manually detectable by the user's hand when wearing the glove, and wherein the processor and program are operatively connected to the pulse generator, wherein the program is programmed to, in real time:

determine, based at least in part on the input video signal, a location of the glove, calculate the simulated pulse signal based on the computational model and the determined location of the surrogate and the glove, and transmit the simulated pulse signal to the pulse generator.

13. The simulator of claim 1, wherein the at least one object comprises a hand of the user.

14. The simulator of claim 1, further comprising a user camera system operatively connected to the processor and aimed toward an area where at least one eye of the user should be during use of the simulator, the user camera system being configured to generate a user video, wherein the program is programmed to, in real time, detect a position of the at least one eye of the user, and calculate the line of sight based on the detected position of the at least one eye.

15. A method of using a simulator, the simulator comprising a physical surrogate for a portion of a simulated human patient, the surrogate having a surface feature of a portion of a human body, the method comprising:

receiving an input video feed from a camera system aimed at the surrogate;

determining, based at least in part on the input video feed, a location of the surrogate and at least one movable object other than the surrogate;

detecting an interaction between the at least one object and the surrogate based at least in part on the determined location of the surrogate and the at least one movable object;

generating a simulated hemodynamic consequence of the detected interaction between the at least one object and the surrogate based on a computational model of a human body's hemodynamic system;

generating a simulated location and appearance of the simulated hemodynamic consequence on the simulated human patient;

identifying a portion of the simulated hemodynamic consequence that is not obstructed from a user's view according to the simulation;

generating a visual rendering of the portion of the appearance of the simulated hemodynamic consequence;

determining from the simulated location of the simulated hemodynamic consequence a corresponding position of the visual rendering relative to the surrogate;

generating an output video feed that comprises at least the visual rendering; and displaying the output video feed on a display that is positioned so that the visual rendering is viewable along a line of sight toward the position of the visual rendering relative to the surrogate.

16. A simulator comprising:

a physical surrogate for a portion of a simulated human patient, the surrogate having the surface features of a portion of a human body;

a camera system aimed at the surrogate to provide all input video feed;

a glove comprising a pulse generator configured to receive a simulated pulse signal and generate a pulse representative of the simulated pulse signal, the generated pulse being manually detectable by a user's hand wearing the glove; and a processor having a program embodied in a non-transitory computer readable medium operatively connected to the camera system and pulse generator, wherein the program is programmed to simulate an interaction between the user's hand and the patient, the program being programmed to, in real time:

receive the input video signal, determine, based at least in part on the input video signal, a location of the surrogate and the glove, calculate the simulated pulse signal based on a hemodynamic model of at least the portion of the simulated human patient and the determined location of the surrogate and the glove, and transmit the simulated pulse signal to the pulse generator.

17. The simulator of claim 16, wherein:

the simulator further comprises a load sensor positioned and configured to generate a load signal representative of a sensed load applied by the user's hand to the surrogate; and the program is programmed to, in real time, determine the simulated pulse signal based at least in part on the load signal.

18. The simulator of claim 17, wherein the load sensor is supported by the glove.

19. The simulator of claim 1, wherein:

the simulated hemodynamic consequence comprises blood flow, and the program is programmed to, in real time, generate the simulated hemodynamic consequence of the detected interaction based on a physics-based simulation of blood flow.

20. The simulator of claim 1, wherein:

(1) the camera system comprises two cameras that provide stereoscopic information to assist the program in determining the location of the surrogate and the at least one object, at least in part, by triangulating the location from the stereoscopic information, or (2) the camera system comprises a camera that includes distance sensors whose measurements are provided to the program to assist the program in determining the location of the surrogate and the at least one object, or (3) the surrogate and the at least one object each comprise colors or spatial tracking markers whose presence in the input video feed assists the program in determining the location of the surrogate and the at least one object.

* * * * *